US011657266B2

United States Patent
Yang et al.

(10) Patent No.: US 11,657,266 B2
(45) Date of Patent: *May 23, 2023

(54) COOPERATIVE MULTI-GOAL, MULTI-AGENT, MULTI-STAGE REINFORCEMENT LEARNING

(71) Applicant: Honda Motor Co., Ltd., Tokyo (JP)

(72) Inventors: Jiachen Yang, San Jose, CA (US); Alireza Nakhaei Sarvedani, Sunnyvale, CA (US); David Francis Isele, Sunnyvale, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 1138 days.

This patent is subject to a terminal disclaimer.

(21) Appl. No.: 16/193,291

(22) Filed: Nov. 16, 2018

(65) Prior Publication Data

US 2020/0160168 A1 May 21, 2020

(51) Int. Cl.
*G06N 3/08* (2023.01)
*G05D 1/00* (2006.01)
(Continued)

(52) U.S. Cl.
CPC ............ *G06N 3/08* (2013.01); *G05D 1/0088* (2013.01); *G06N 3/045* (2023.01); *G06N 3/047* (2023.01); *H04W 4/44* (2018.02)

(58) Field of Classification Search
CPC ...... G06N 3/08; G06N 3/0454; G06N 3/0472; H04W 4/44; G05D 1/0088
(Continued)

(56) References Cited

U.S. PATENT DOCUMENTS

| 6,405,132 B1 | 6/2002 | Breed et al. |
| 9,015,093 B1 * | 4/2015 | Commons ............. B60W 30/00 706/26 |

(Continued)

FOREIGN PATENT DOCUMENTS

| JP | 2016207016 | 12/2016 |
| JP | 2017081421 | 5/2017 |

(Continued)

OTHER PUBLICATIONS

Notice of Allowance of U.S. Appl. No. 16/397,752 dated Apr. 20, 2021, 38 pages.

(Continued)

*Primary Examiner* — Mahmoud S Ismail
(74) *Attorney, Agent, or Firm* — Rankin, Hill & Clark LLP

(57) ABSTRACT

According to one aspect, cooperative multi-goal, multi-agent, multi-stage (CM3) reinforcement learning may include training a first agent using a first policy gradient and a first critic using a first loss function to learn goals in a single-agent environment using a Markov decision process, training a number of agents based on the first policy gradient and a second policy gradient and a second critic based on the first loss function and a second loss function to learn cooperation between the agents in a multi-agent environment using a Markov game to instantiate a second agent neural network, each of the agents instantiated with the first agent neural network in a pre-trained fashion, and generating a CM3 network policy based on the first agent neural network and the second agent neural network. The CM3 network policy may be implemented in a CM3 based autonomous vehicle to facilitate autonomous driving.

20 Claims, 13 Drawing Sheets

(51) Int. Cl.
 H04W 4/44 (2018.01)
 G06N 3/045 (2023.01)
 G06N 3/047 (2023.01)

(58) Field of Classification Search
 USPC .......................................................... 706/10
 See application file for complete search history.

(56) References Cited

U.S. PATENT DOCUMENTS

| | | | |
|---|---|---|---|
| 9,632,502 | B1 | 4/2017 | Levinson et al. |
| 10,698,421 | B1* | 6/2020 | Harris ................... H04W 4/024 |
| 2016/0257305 | A1 | 9/2016 | Riviere-Cazaux |
| 2017/0031361 | A1 | 2/2017 | Olson et al. |
| 2017/0236052 | A1 | 8/2017 | Israelsson et al. |
| 2018/0060701 | A1 | 3/2018 | Krishnamurthy et al. |
| 2018/0107215 | A1 | 4/2018 | Djuric et al. |
| 2018/0120843 | A1 | 5/2018 | Berntorp et al. |
| 2018/0121768 | A1 | 5/2018 | Lin et al. |
| 2018/0150701 | A1 | 5/2018 | Kang et al. |
| 2018/0373980 | A1 | 12/2018 | Huval |
| 2019/0065951 | A1 | 2/2019 | Luo et al. |
| 2019/0228571 | A1 | 7/2019 | Atsmon |
| 2019/0243372 | A1 | 8/2019 | Huval et al. |
| 2019/0250568 | A1* | 8/2019 | Li ............................ G06N 3/08 |
| 2019/0291727 | A1* | 9/2019 | Shalev-Shwartz ..... G08G 1/166 |
| 2020/0125955 | A1* | 4/2020 | Klinger ................ G06N 3/0454 |
| 2020/0125957 | A1* | 4/2020 | Lu ....................... G06F 16/9024 |
| 2020/0143208 | A1* | 5/2020 | Hernandez Leal ...... G06N 3/08 |

FOREIGN PATENT DOCUMENTS

| | | |
|---|---|---|
| WO | WO2017/080709 | 5/2017 |
| WO | WO2016/067336 | 8/2017 |
| WO | WO2017/163538 | 1/2019 |

OTHER PUBLICATIONS

Notice of Allowance of U.S. Appl. No. 16/103,847 dated Apr. 15, 2020, 25 pages.

Austerweil, J. L., Brawner, S., Greenwald, A., Hilliard, E., Ho, M., Littman, M. L., MacGlashan, J., and Trimbach, C. (2016). How other-regarding preferences can promote cooperation in non- zero-sum grid games. In Proceedings of the AAAI Symposium on Challenges and Opportunities in Multiagent Learning for the Real World.

Bansal, T., Pachocki, J., Sidor, S., Sutskever, I., and Mordatch, I. (2017). Emergent complexity via multi-agent competition. arXiv preprint arXiv:1710.03748.

Bengio, Y., Louradour, J., Collobert, R., and Weston, J. (2009). Curriculum learning. In Proceedings of the 26th annual international conference on machine learning, pp. 41-48. ACM.

Cao, Y., Yu, W., Ren, W., and Chen, G. (2013). An overview of recent progress in the study of distributed multi-agent coordination. IEEE Transactions on Industrial informatics, 9(1), 427-438.

Chang, Y.-H., Ho, T., and Kaelbling, L. P. (2004). All learning is local: Multi-agent learning in global reward games. In Advances in neural information processing systems, pp. 807-814.

Foerster, J., Farquhar, G., Afouras, T., Nardelli, N., and Whiteson, S. (2017). Counterfactual multi-agent policy gradients. arXiv preprint arXiv:1705.08926.

Gupta, J. K., Egorov, M., and Kochenderfer, M. (2017). Cooperative multi-agent control using deep reinforcement learning. In International Conference on Autonomous Agents and Multiagent Systems, pp. 66-83. Springer.

Hu, J. and Wellman, M. P. (2003). Nash q-learning for general-sum stochastic games. Journal of machine learning research, Nov. 4, 1039-1069.

Isele, D., Cosgun, A., Subramanian, K., and Fujimura, K. (2017). Navigating intersections with autonomous vehicles using deep reinforcement learning. arXiv preprint arXiv:1705.01196.

Konda, V. R. and Tsitsiklis, J. N. (2000). Actor-critic algorithms. In Advances in neural information processing systems, pp. 1008-1014.

Krajzewicz, D., Erdmann, J., Behrisch, M., and Bieker, L. (2012). Recent development and applications of SUMO—Simulation of Urban MObility. International Journal On Advances in Systems and Measurements, 5(3&4), 128-138.

Kuefler, A., Morton, J., Wheeler, T., and Kochenderfer, M. (2017). Imitating driver behavior with generative adversarial networks. arXiv preprint arXiv:1701.06699.

Leibo, J. Z., Zambaldi, V., Lanctot, M., Marecki, J., and Graepel, T. (2017). Multi-agent reinforcement learning in sequential social dilemmas. In Proceedings of the 16th Conference on Autonomous Agents and MultiAgent Systems, pp. 464-473. International Foundation for Autonomous Agents and Multiagent Systems.

Lillicrap, T. P., Hunt, J. J., Pritzel, A., Heess, N., Erez, T., Tassa, Y., Silver, D., and Wierstra, D. (2015). Continuous control with deep reinforcement learning. arXiv preprint arXiv:1509.02971.

Littman, M. L. (1994). Markov games as a framework for multi-agent reinforcement learning. In Machine Learning Proceedings 1994, pp. 157-163. Elsevier.

Lowe, R., Wu, Y., Tamar, A., Harb, J., Abbeel, O. P., and Mordatch, I. (2017). Multi-agent actor-critic for mixed cooperative-competitive environments. In Advances in Neural Information Processing Systems, pp. 6382-6393.

Marler, R. T. and Arora, J. S. (2004). Survey of multi-objective optimization methods for engineering. Structural and multidisciplinary optimization, 26(6), 369-395.

Mnih, V., Kavukcuoglu, K., Silver, D., Rusu, A. A., Veness, J., Bellemare, M. G., Graves, A., Riedmiller, M., Fidjeland, A. K., Ostrovski, G., et al. (2015). Human-level control through deep reinforcement learning. Nature, 518(7540), 529.

Mordatch, I. and Abbeel, P. (2017). Emergence of grounded compositional language in multi-agent populations. arXiv preprint arXiv:1703.04908.

Oliehoek, F. A., Spaan, M. T., and Vlassis, N. (2008). Optimal and approximate q-value functions for decentralized pomdps. Journal of Artificial Intelligence Research, 32, 289-353.

Pan, S. J. and Yang, Q. (2010). A survey on transfer learning. IEEE Transactions on knowledge and data engineering, 22(10), 1345-1359.

Panait, L. and Luke, S. (2005). Cooperative multi-agent learning: The state of the art. Au-tonomous agents and multi-agent systems, 11(3), 387-434.

Rusu, A. A., Rabinowitz, N. C., Desjardins, G., Soyer, H., Kirkpatrick, J., Kavukcuoglu, K., Pas-canu, R., and Hadsell, R. (2016). Progressive neural networks. arXiv preprint arXiv:1606.04671.

Schaul, T., Horgan, D., Gregor, K., and Silver, D. (2015). Universal value function approximators. In International Conference on Machine Learning, pp. 1312-1320.

Silver, D., Schrittwieser, J., Simonyan, K., Antonoglou, I., Huang, A., Guez, A., Hubert, T., Baker, L., Lai, M., Bolton, A., et al. (2017). Mastering the game of go without human knowledge. Nature, 550(7676), 354.

Sutton, R. S. and Barto, A. G. (1998). Reinforcement learning: An introduction, vol. 1. MIT press Cambridge.

Sutton, R. S., McAllester, D. A., Singh, S. P., and Mansour, Y. (2000). Policy gradient methods for reinforcement learning with function approximation. In Advances in neural information processing systems, pp. 1057-1063.

Tampuu, A., Matiisen, T., Kodelja, D., Kuzovkin, I., Korjus, K., Aru, J., Aru, J., and Vicente, R. (2017). Multiagent cooperation and competition with deep reinforcement learning. PloS one, 12(4), e0172395.

Tan, M. (1993). Multi-agent reinforcement learning: Independent vs. cooperative agents. In Proceedings of the tenth international conference on machine learning, pp. 330-337.

Thrun, S. B. (1992). Efficient exploration in reinforcement learning.

Van Lange, P. A., Joireman, J., Parks, C. D., and Van Dijk, E. (2013). The psychology of social dilemmas: A review. Organizational Behavior and Human Decision Processes, 120(2), 125-141.

Zhang, K., Yang, Z., Liu, H., Zhang, T., and Bas,ar, T. (2018). Fully decentralized multi-agent reinforcement learning with networked agents. arXiv preprint arXiv:1802.08757.

(56) References Cited

OTHER PUBLICATIONS

C. R. Baker and J. M. Dolan, "Traffic interaction in the urban challenge: Putting boss on its best behavior," in 2008 IEEE/RSJ International Conference on Intelligent Robots and Systems (IROS), pp. 1752-1758.
M. Bojarski, D. Del Testa, D. Dworakowski, B. Firner, B. Flepp, P. Goyal, L. D. Jackel, M. Monfort, U. Muller, J. Zhang, et al., "End to end learning for self-driving cars," arXiv preprint arXiv:1604.07316, 2016.
C. Chen, A. Seff, A. Kornhauser, and J. Xiao, "Deepdriving: Learning affordance for direct perception in autonomous driving," in Proceedings of the IEEE International Conference on Computer Vision, pp. 2722-2730, 2015.
A. Cosgun, L. Ma, J. Chiu, J. Huang, M. Demir, A. M. Anon, T. Lian, H. Tafish, and S. Al-Stouhi, "Towards full automated drive in urban environments: A demonstration in gomentum station, california," in IEEE Intelligent Vehicles Symposium, IV 2017, Los Angeles, CA, USA, Jun. 11-14, 2017, pp. 1811-1818, 2017.
Y. Du, Y. Wang, and C.-Y. Chan, "Autonomous lane-change controller via mixed logical dynamical," in Intelligent Transportation Systems (ITSC), 2014 IEEE 17th International Conference on, pp. 1154-1159, IEEE, 2014.
P. Falcone, F. Borrelli, J. Asgari, H. E. Tseng, and D. Hrovat, "Predictive active steering control for autonomous vehicle systems," IEEE Transactions on control systems technology, vol. 15, No. 3, pp. 566-580, 2007.
C. Hatipoglu, U. Ozguner, and K. A. Redmill, "Automated lane change controller design," IEEE transac-tions on intelligent transportation systems, vol. 4, No. 1, pp. 13-22, 2003.
C. Hubmann, M. Becker, D. Althoff, D. Lenz, and C. Stiller, "Decision making for autonomous driving considering interaction and uncertain prediction of surrounding vehicles," in 2017 IEEE Intelligent Vehicles Symposium (IV), pp. 1671-1678.
H. Jula, E. B. Kosmatopoulos, and P. A. Ioannou, "Collision avoidance analysis for lane changing and merging," IEEE Transactions on vehicular technology, vol. 49, No. 6, pp. 2295-2308, 2000.
J. Koutník, G. Cuccu, J. Schmidhuber, and F. Gomez, "Evolving large-scale neural networks for vision-based torcs," 2013.
S. Krauβ, P. Wagner, and C. Gawron, "Metastable states in a microscopic model of traffic flow," Physical Review E, vol. 55, No. 5, p. 5597, 1997.
I. Miller et al., "Team Cornell's Skynet: Robust perception and planning in an urban environment," J. Field Robot., vol. 25, No. 8, pp. 493-527, 2008.
M. Montemerlo et al., "Junior: The Stanford entry in the urban challenge," J. Field Robot., vol. 25, No. 9, pp. 569-597, 2008.
U. Muller, J. Ben, E. Cosatto, B. Flepp, and Y. L. Cun, "Off-road obstacle avoidance through end-to-end learning," in Advances in neural information processing systems, pp. 739-746, 2006.
M. Mukadam, A. Cosgun, A. Nakhaei, and K. Fujimura, "Tactical Decision Making for Lane Changing with Deep Reinforcement Learning," in 31th Conference on Neural Information Processing Systems (NIPS), 2017.
J. E. Naranjo, C. Gonzalez, R. Garcia, and T. De Pedro, "Lane-change fuzzy control in autonomous vehicles for the overtaking maneuver," IEEE Transactions on Intelligent Transportation Systems, vol. 9, No. 3, pp. 438-450, 2008.
J. Nilsson and J. Sjoberg, "Strategic decision making for automated driving on two-lane, one way roads using model predictive control," in IEEE Intelligent Vehicles Symposium, 2013, pp. 1253-1258.
P. Petrov and F. Nashashibi, "Adaptive steering control for autonomous lane change maneuver," in Intelligent Vehicles Symposium (IV), 2013 IEEE, pp. 835-840, IEEE, 2013.
D. Sadigh, S. Sastry, S. A. Seshia, and A. D. Dragan, "Planning for autonomous cars that leverage effects on human actions", in Robotics: Science and Systems, 2016.
W. Schwarting, J. Alonso-Mora, and D. Rus, "Planning and decision making for autonomous vehicles," in Annual Review of Control, Robotics, and Autonomous Systems, 2018.
S. Shalev-Shwartz, S. Shammah, A. Shashua, "On a formal model of safe and scalable self-driving cars," arXiv:1708.06374, 2017.
S. Sharifzadeh, I. Chiotellis, R. Triebel, and D. Cremers, "Learning to drive using inverse reinforcement learning and deep q-networks," arXiv preprint arXiv:1612.03653, 2016.
S. Shalev-Shwartz, S. Shammah, and A. Shashua, "Safe, multi-agent, reinforcement learning for au-tonomous driving," arXiv preprint arXiv:1610.03295, 2016.
Z. Shiller and S. Sundar, "Emergency lane-change maneuvers of autonomous vehicles," Journal of Dynamic Systems, Measurement, and Control, vol. 120, No. 1, pp. 37-44, 1998.
C. J. Taylor, J. Košecká, R. Blasi, and J. Malik, "A comparative study of vision-based lateral control strategies for autonomous highway driving," The International Journal of Robotics Research, vol. 18, No. 5, pp. 442-453, 1999.
H. Tehrani, Q. H. Do, M. Egawa, K. Muto, K. Yoneda, and S. Mita, "General behavior and motion model for automated lane change," in Intelligent Vehicles Symposium (IV), 2015 IEEE, pp. 1154-1159, IEEE, 2015.
C. Urmson, J. Anhalt, D. Bagnell, C. Baker, R. Bittner, M. Clark, J. Dolan, D. Duggins, T. Galatali, C. Geyer, et al., "Autonomous driving in urban environments: Boss and the urban challenge," Journal of Field Robotics, vol. 25, No. 8, pp. 425-466, 2008.
R. van der Horst and J. Hogema, Time-to-collision and collision avoidance systems. na, 1993.
R. J. Williams, "Simple statistical gradient-following algorithms for connectionist reinforcement learning," in Machine learning, 1992.
P. Wolf, K. Kurzer, T. Wingert, F. Kuhnt, and J. M. Zöllner, "Adaptive Behavior Generation for Autonomous Driving using Deep Reinforcement Learning with Compact Semantic States." in 2018 IEEE Intelligent Vehicle Symposium (IV), pp. 993-1000.
H. Xu, Y. Gao, F. Yu, and T. Darrell, "End-to-end learning of driving models from large-scale video datasets," arXiv preprint arXiv:1612.01079, 2016.
J. Yang, A. Nakhaei, D. Isele, H. Zha, and K. Fujimura, "CM3: Cooperative Multi-goal Multi-stage Multi-agent Reinforcement Learning," arXiv preprint, 2018.
F. You, R. Zhang, G. Lie, H. Wang, H. Wen, and J. Xu, "Trajectory planning and tracking control for autonomous lane change maneuver based on the cooperative vehicle infrastructure system," Expert Systems with Applications, vol. 42, No. 14, pp. 5932-5946, 2015.
J. Ziegler, P. Bender, T. Dang, and C. Stiller, "Trajectory planning for bertha—a local, continuous method," in Intelligent Vehicles Symposium Proceedings, 2014 IEEE, pp. 450-457, IEEE, 2014.

* cited by examiner

Cooperative multi-goal multi-stage multi-agent reinforcement learning (CM3)

procedure CM3
    for curriculum stage $c = 1$ to $2$ do
        if $c = 1$ then
            Set number of agents $N = 1$
            Initialize Stage 1 main networks $V := V_1, \pi := \pi_1$ and target network $V' := V'_1$
        else if $c = 2$ then
            Instantiate $N > 1$ agents
            Construct Stage 2 networks: $V := \{V_1, V_2\}$ and $\pi := \{\pi_1, \pi_2\}$
            Initialize centralized critic network $Q$, and target networks $V', Q', \pi'$
            Restore values of previously-trained parameters $\theta_{V_1}, \theta_{\pi_1}$
        end if
        Set all target network weights to equal main networks weights
        Initialize exploration parameter $\epsilon = \epsilon_{\text{start}}$ and empty replay buffer $B$
        for each training episode $m = 1$ to $M$ do
            Assign goal(s) $g_m^n$ to agent(s) according to given distribution
            Get initial state $s_1$ and observation(s) $o_1$
            for $t = 1$ to $T$ do
                Sample action $a_t^n \sim \pi(a_t^n | o_t^n; \theta_\pi, \epsilon)$ for each agent.
                Execute action(s) $\mathbf{a}_t$, receive reward(s) $\{r_t^n\}, R_t^g$ and next state $s_{t+1}, \mathbf{o}_{t+1}$
                Store $(s_t, \mathbf{o}_t, \mathbf{g}_m, \mathbf{a}_t, \{r_t^n\}, R_t^g, s_{t+1}, \mathbf{o}_{t+1})$ into $B$
                Sample minibatch of $S$ transitions $(s_i, \mathbf{o}_i, \mathbf{g}, \mathbf{a}_i, \{r_i^n\} R_i^g, s_{i+1}, \mathbf{o}_{i+1})$ from $B$
                // Execute the following computations for all agents in parallel
                Compute TD target $x_i^n = r_i^n + \gamma V(o_{i+1}, g^n; \theta'_V)$
                Update decentralized critic by minimizing $L(\theta_V) = \frac{1}{S} \sum_i (x_i^n - V(o_i, g^n; \theta_V))^2$ Compute policy gradient in local view $$\nabla_{\theta_\pi} J_{\text{local}}(\pi) = \frac{1}{S} \sum_j \sum_{n=1}^{N} \sum_{l=1}^{N} \nabla_{\theta_\pi} \log \pi(a_j^l | o_j^l, g^l)(x_j^n - V(o_j, g^n; \theta_V))$$

if $c = 1$ then
                    Update policy: $\theta_\pi \leftarrow \theta_\pi + \beta \nabla_{\theta_\pi} J_{\text{local}}$
                else if $c = 2$ then
                    Compute TD target $y_i^n = R_i^g + \gamma Q(s_{i+1}, \mathbf{a}_{i+1}^{-n}, a_{i+1}^n, \mathbf{g}; \theta'_Q)|_{a_{i+1} \sim \pi'}$
                    Minimize loss $L(\theta_Q) = \frac{1}{S} \sum_i (y_i^n - Q(s_i, \mathbf{a}_i^{-n}, a_i^n, \mathbf{g}; \theta_Q))^2$
                    Compute $A^n(s_i, \mathbf{a}_i, \mathbf{g}) = Q(s_i, \mathbf{a}_i^{-n}, a_i^n, \mathbf{g}) - \langle Q(s_i, \mathbf{a}_i^{-n}, \cdot, \mathbf{g}), \pi(\cdot | o_i^n, g^n) \rangle$
                    Compute policy gradient in global view

FIG. 5A $$\nabla_\theta J_{global}(\pi) = \frac{1}{S} \sum_i \sum_{n=1}^{N} \nabla_\theta \log \pi^n(a^n | o^n, g^n) A^n(s_i, a_i, g)$$

Update policy: $\theta_\pi \leftarrow \theta_\pi + \beta(\alpha \nabla_{\theta_\pi} J_{local} + (1-\alpha) \nabla_{\theta_\pi} J_{global})$
   end if
   Update target network parameters $\theta' \leftarrow \tau\theta + (1-\tau)\theta'$
   $s_t \leftarrow s_{t+1}, o_t \leftarrow o_{t+1}$
  end for
  If $\epsilon > \epsilon_{end}$, then $\epsilon \leftarrow \epsilon - \epsilon_{step}$
 end for
 endfor
endprocedure

FIG. 5B

COOPERATIVE MULTI-GOAL, MULTI-AGENT, MULTI-STAGE REINFORCEMENT LEARNING

BACKGROUND

Efficient exploration in reinforcement learning may be difficult in a multi-agent setting, where the state space and joint action space scale exponentially with the number of agents. Relying on random exploration to learn both individual task completion and cooperative behavior concurrently may be highly inefficient. Agents who have not yet learned to accomplish local goals may rarely encounter the region of state space where cooperation is needed, rendering any exploration actions useless for learning cooperative behavior. On the other extreme, exploratory actions taken in situations that require coordination may lead to failure, and the resulting penalties may cause agents to avoid the coordination problem altogether and fail to learn their individual tasks.

BRIEF DESCRIPTION

According to one aspect, a method for cooperative multi-goal, multi-agent, multi-stage (CM3) reinforcement learning may include training a first agent based on a first policy gradient and training a first critic based on a first loss function to learn one or more features in a single-agent environment using a Markov decision process. The first agent may be associated with a first agent neural network and the first critic may be associated with a first critic neural network. The method may include training a number of N agents based on the first policy gradient and a second policy gradient and training a second critic based on the first loss function and a second loss function to learn cooperation between the N agents in a multi-agent environment using a Markov game to instantiate a second agent neural network. Each of the N agents may be instantiated with the first agent neural network in a pre-trained fashion. The method may include generating a cooperative multi-goal, multi-agent, multi-stage network policy based on the first agent neural network and the second agent neural network.

The first critic may be a decentralized critic and the second critic may be a centralized critic. Training of the first agent in the single-agent environment may occur prior to training the N agents in the multi-agent environment. The method may include training the number of N agents based on a combined policy gradient derived from the first policy gradient and the second policy gradient.

The second agent neural network may be associated with an $o_{others}$ parameter for each of the N agents indicative of a local observation of each of the corresponding N agents. The $o_{others}$ parameter may be indicative of a velocity of the first agent, a number of lanes or sub-lanes between the first agent and one of the N agents, a distance from the first agent to a goal position, or a vehicle type associated with the first agent. The $o_{others}$ parameter may be indicative of a vehicle occupancy status associated with one of the N agents, a relative velocity of one of the N agents relative to the first agent, or a vehicle type associated with one of the N agents. The number of N agents may include the first agent. Training of the first agent and training of the number of N agents may include generating one or more actions including a no-operation action, an acceleration action, a deceleration action, a shift left one sub-lane action, and a shift right one sub-lane action.

According to one aspect, a system for cooperative multi-goal, multi-agent, multi-stage (CM3) reinforcement learning may include a processor, a memory, and a simulator implemented via the processor and memory. The simulator may perform training a first agent based on a first policy gradient and training a first critic based on a first loss function to learn one or more features in a single-agent environment using a Markov decision process. The first agent may be associated with a first agent neural network and the first critic may be associated with a first critic neural network. The simulator may perform training a number of N agents based on the first policy gradient and a second policy gradient and training a second critic based on the first loss function and a second loss function to learn cooperation between the N agents in a multi-agent environment using a Markov game to instantiate a second agent neural network. Each of the N agents may be instantiated with the first agent neural network in a pre-trained fashion. The simulator may perform generating a cooperative multi-goal, multi-agent, multi-stage network policy based on the first agent neural network and the second agent neural network.

The first critic may be a decentralized critic and the second critic may be a centralized critic. The simulator may train the first agent in the single-agent environment prior to training the N agents in the multi-agent environment. The second agent neural network may be associated with an $o_{others}$ parameter for each of the N agents indicative of a local observation of each of the corresponding N agents.

According to one aspect, a cooperative multi-goal, multi-agent, multi-stage (CM3) reinforcement learning based autonomous vehicle may be a vehicle including a storage device and a controller. The storage device may store a cooperative multi-goal, multi-agent, multi-stage network policy. The controller may operate the autonomous vehicle in an autonomous fashion based on the cooperative multi-goal, multi-agent, multi-stage network policy. The cooperative multi-goal, multi-agent, multi-stage network policy may be generated based on a first agent neural network and a second agent neural network. A first agent may be trained based on a first policy gradient and a first critic trained based on a first loss function to learn one or more features in a single-agent environment using a Markov decision process. The first agent may be associated with the first agent neural network and the first critic may be associated with a first critic neural network. A number of N agents may be trained based on the first policy gradient and a second policy gradient and a second critic trained based on the first loss function and a second loss function to learn cooperation between the N agents in a multi-agent environment using a Markov game to instantiate the second agent neural network Each of the N agents may be instantiated with the first agent neural network in a pre-trained fashion.

The second agent neural network may be associated with an $o_{others}$ parameter for each of the N agents indicative of a local observation of each of the corresponding N agents. The $o_{others}$ parameter may be indicative of a velocity of the first agent, a number of lanes or sub-lanes between the first agent and one of the N agents, a distance from the first agent to a goal position, or a vehicle type associated with the first agent. The $o_{others}$ parameter may be indicative of a vehicle occupancy status associated with one of the N agents, a relative velocity of one of the N agents relative to the first agent, or a vehicle type associated with one of the N agents. The number of N agents may include the first agent. Training the first agent and training the number of N agents may include generating one or more actions including a no-operation action, an acceleration action, a deceleration action, a shift left one sub-lane action, and a shift right one sub-lane action.

BRIEF DESCRIPTION OF THE DRAWINGS

FIGS. 5A-5B is an exemplary flow diagram of a method for cooperative multi-goal, multi-agent, multi-stage reinforcement learning, according to one aspect.

DETAILED DESCRIPTION

Figure 1:
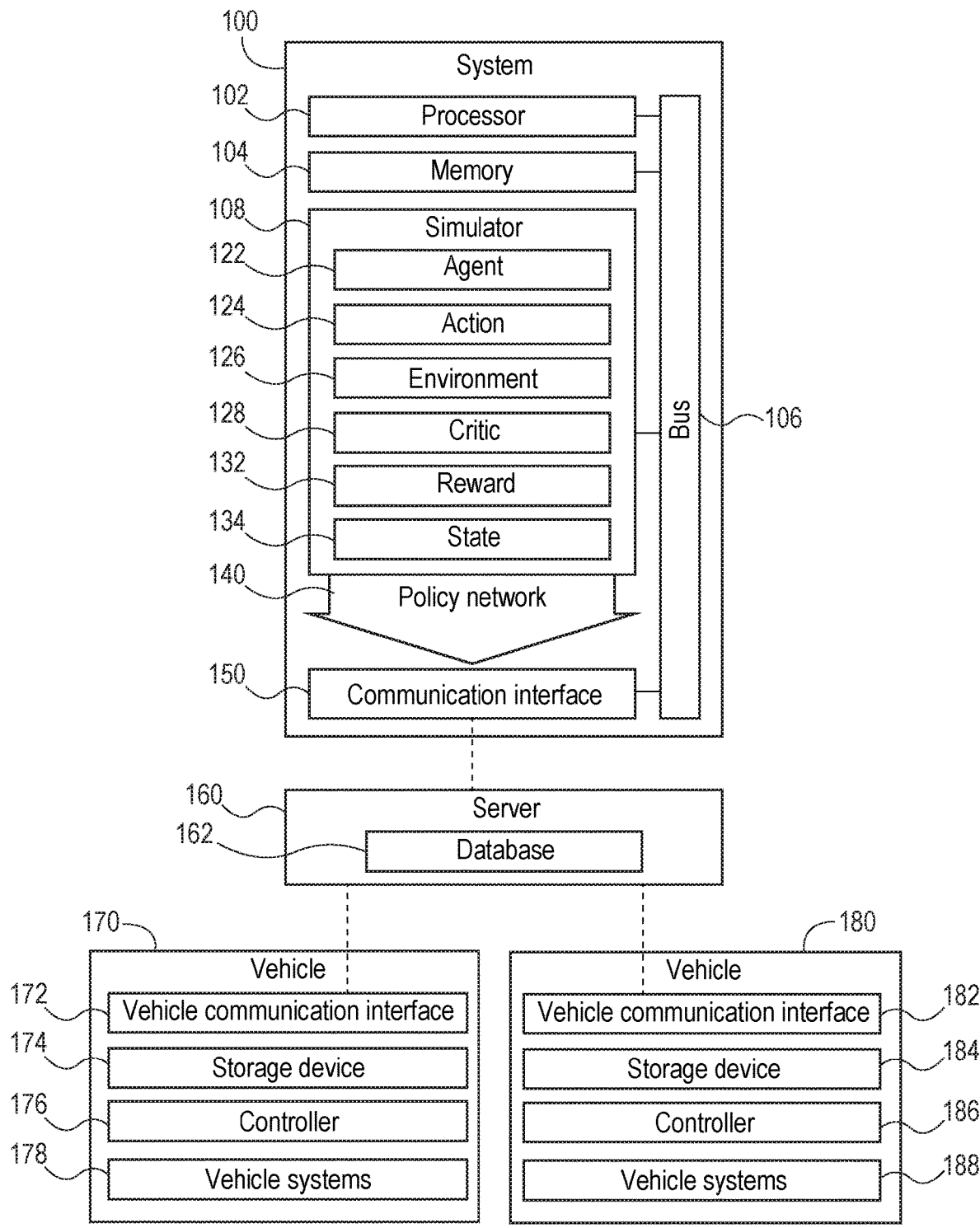
FIG. 1 is an exemplary component diagram of a system for cooperative multi-goal, multi-agent, multi-stage (CM3) reinforcement learning, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, may refer to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

An "agent", as used herein, may refer to a "vehicle", such as a vehicle within a simulation or a simulated vehicle. Similarly, "actor" as used herein, may be used interchangeably with "agent". Additionally, "setting" as used herein, may be used interchangeably with "environment". A, "feature" as used herein, may include a goal.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 3:
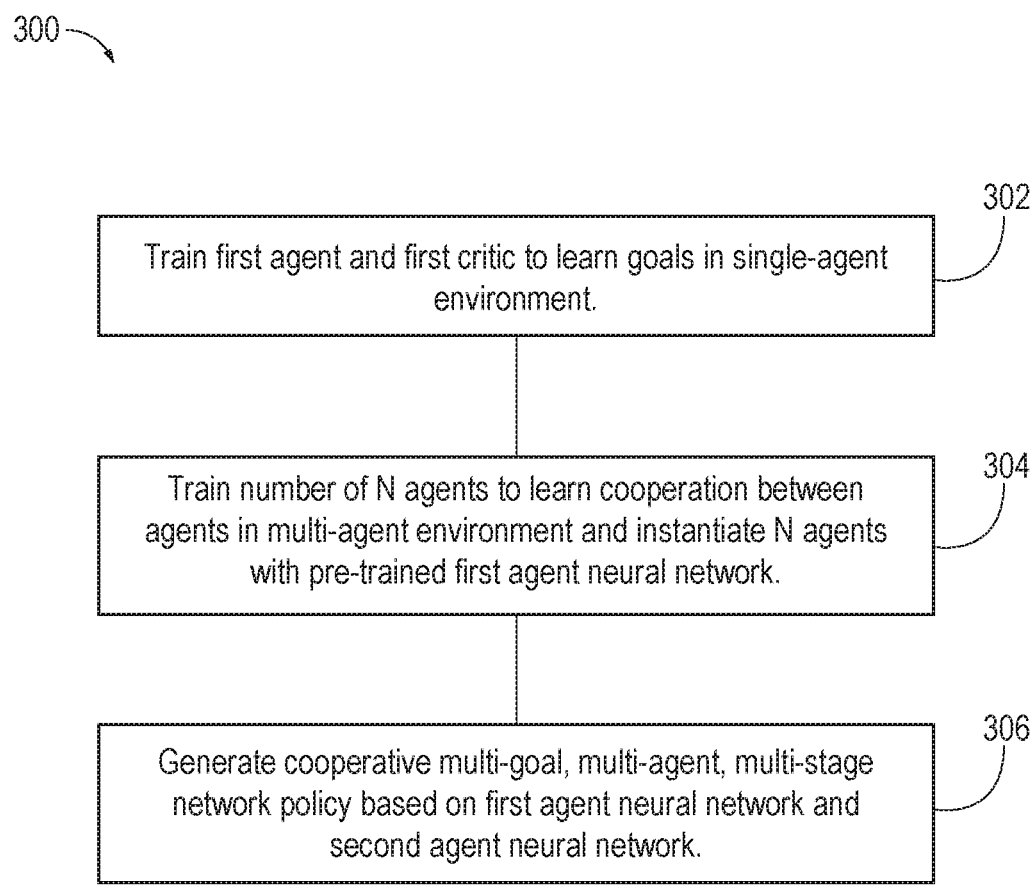
FIG. 3 is an exemplary flow diagram of a method for cooperative multi-goal, multi-agent, multi-stage reinforcement learning, according to one aspect.

As used herein, "CM3" may refer to the use of a method for cooperative multi-goal, multi-agent, multi-stage reinforcement learning or a system for cooperative multi-goal, multi-agent, multi-stage reinforcement learning, including but not limited to the system of FIG. 1, the method of FIG. 3, the method of FIGS. 5A-5B, etc.

FIG. 1 is an exemplary component diagram of a system 100 for cooperative multi-goal, multi-agent, multi-stage (CM3) reinforcement learning, according to one aspect. The system 100 for CM3 reinforcement learning may include a processor 102, a memory 104, a bus 106, and a simulator 108. The simulator 108 may be implemented via the processor 102 and the memory 104. The simulator 108 may simulate or perform simulation associated with one or more agents 122, taking one or more actions 124, within a simulation environment 126, where one or more critics 128 interpret or evaluate one or more of the actions 124 taken by one or more of the agents 122 to determine one or more rewards 132 and one or more states 134 resulting from the actions taken.

The simulator 108 or the processor 102 may generate a CM3 policy network 140, which may be stored on the memory 104 of the system 100 for CM3 reinforcement learning. The system may further include a communication interface 150 which enables the CM3 policy network 140 to be transmitted to other devices, such as a server 160, which may include a CM3 database 162. In this way, the CM3 policy network 140 generated by the system 100 for CM3 reinforcement learning may be stored on the CM3 database 162 of the server 160.

The server may then propagate the CM3 policy network 140 to one or more vehicles, such as a first vehicle 170 and a second vehicle 180. The first vehicle may be equipped with a vehicle communication interface 172, a storage device 174, a controller 176, and one or more vehicle systems 178. The storage device may store the CM3 policy network 140 from the server, and the controller may operate the first vehicle in an autonomous fashion based on the CM3 policy network 140. Similarly, the second vehicle 180 may be equipped with a vehicle communication interface 182, a storage device 184, a controller 186, and one or more vehicle systems 188, and may operate similarly to the first vehicle.

In any event, when the CM3 policy network 140 is stored on the storage device of the vehicle, this enables the controller to autonomously drive the vehicle around based on the CM3 policy network 140, and to make autonomous driving decisions according to the CM3 reinforcement learning which occurred within the simulator 108 because the CM3 policy network 140 may be indicative of one or more of the policies or decisions which should be made based on the training or the simulation. For example, the CM3 network policy may receive an input of an observation associated with the first autonomous vehicle or the second autonomous vehicle (e.g., a vehicle state or an environment state) and output a suggested action.

Figure 2:
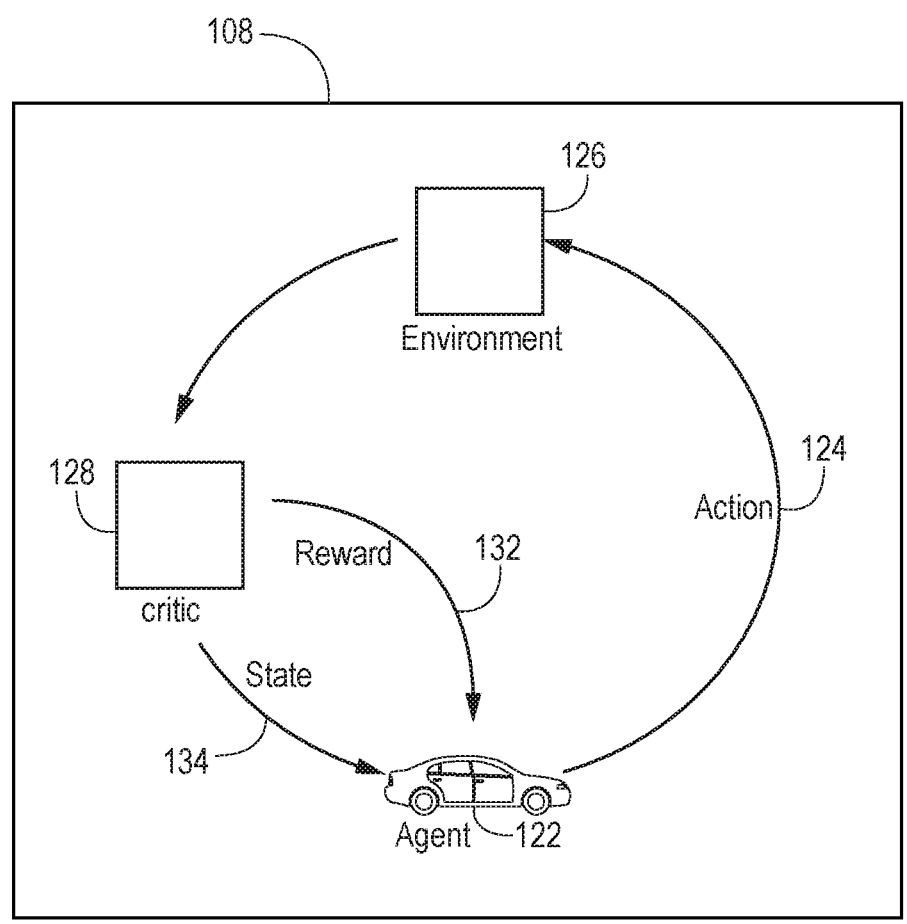
FIG. 2 is an exemplary component diagram of a simulator for the system for cooperative multi-goal, multi-agent, multi-stage reinforcement learning of FIG. 1.

FIG. 2 is an exemplary component diagram of the simulator 108 for the system 100 for cooperative multi-goal, multi-agent, multi-stage reinforcement learning of FIG. 1. In FIG. 2, the simulator 108 of the system 100 for CM3 reinforcement learning of FIG. 1 may be seen. Here, the agent may take the action in the environment. This may be interpreted, by the critic, as the reward or penalty and a representation of the state, which may be then fed back into the agent. The agent may interact with the environment by taking the action at a discrete time step. At each time step, the agent may receive an observation which may include the reward. The agent may select one action from a set of available actions, which results in a new state and a new reward for a subsequent time step. The goal of the agent is generally to collect the greatest amount of rewards possible.

Stage One/Local View/Single-Agent Environment

According to one aspect, the simulator 108 may perform stage one training including training a first agent based on a first policy gradient and a training first critic based on a first loss function to learn one or more features in a single-agent environment using a Markov decision process (MDP). During the first stage or stage one, the simulator 108 may train the agent to achieve one or more individual tasks or to achieve different goals in a single-agent setting or environment (i.e., where there are no other agents within the environment). This may be a static environment. The single-agent setting or environment provided by the simulator 108 in stage one enables the first agent to learn or be trained on the one or more features in an expedient fashion. In other words, by reducing the number of agents in the first stage, the first agent may be trained in a faster, more efficient manner. Explained yet another way, agents that achieve local objectives in the absence of other agents may more reliably produce the desired state configurations for learning cooperative behavior.

The simulator 108 may train the first agent by enabling the first agent to select an action from a set of one or more actions including a no-operation action, an acceleration action, a deceleration action, a shift left one sub-lane action, and a shift right one sub-lane action.

Examples of one or more of the features which may be learned in stage one by the first agent may include learning rules and regulations of the roadway, how to drive on a roadway within the speed limit or maintain speed, how to maintain the vehicle within the lane, how to change lanes or change sub-lane positions, how to exit on an exit ramp, how to enter an on-ramp, etc.

In this way, the first policy network has a decentralized critic which may learn different features in the single-agent setting or environment. Because the first critic may be the decentralized critic, the first stage or stage one may be associated with a local view or individualized rewards, individualized learning, etc. for the first agent.

Stage Two/Global View/Multi-Agent Environment

According to one aspect, the simulator 108 may perform stage two training including training a number of N agents based on the first policy gradient and a second policy gradient and training a second critic based on the first loss function and a second loss function to learn a second set of features, such as cooperation, between the N agents in a multi-agent environment using a Markov game to instantiate a second agent neural network. During the stage two training, each one of the N agents may be instantiated with the pre-trained first agent neural network. In this way, by instantiating each one of the N agents with prior knowledge from the pre-trained first agent neural network, curriculum gain may be implemented via the system 100 for CM3 reinforcement learning. In this regard, the simulator 108 may train the first agent in the single-agent environment may occur prior to training the N agents in the multi-agent environment. The simulator 108 may train the number of N agents based on a combined policy gradient derived from the first policy gradient and the second policy gradient. The number of N agents may include the first agent.

For the Markov game, each agent may thus learn to accomplish one or more goals or features within a finite set, cooperate with other agents for collective success of goals between or among the N number of agents, and act independently with limited local information during the simulation. The simulator 108 may formulate the environments (e.g., the single-agent and the multi-agent environments) as episodic environments, where each agent may be assigned randomly-sampled goals during each training episode. In any event, the simulator 108 may setup the environments as a multi-goal Markov game, and review the actor-critic approach to centralized training of decentralized policies.

With respect to the Markov game, the simulator 108 may define a multi-goal Markov game as a tuple $\langle S, \{O^n\}, \{A^n\}, P, R, G, N, \gamma \rangle$, with N agents labeled by n=[1 ... N]. Each agent may have one goal $g^n \in G$ during each episode. At each time step t, the configuration of agents may be completely specified by a state $s_t \in S$, while each agent n receives a partial observation $o_t^n \in O^n$ and chooses an action $a_t^n \in A^n$. The simulator 108 may set the environment to a next state $s_{t+1}$ due to the joint action $a_t:=\{a_t^1 \ldots a_t^N\}$, according to a transition probability $P(S_{t+1}|s_t, a): S \times A^1 \times \ldots \times A^N \times S \rightarrow [0, 1]$. Each agent may receive a reward R: $S \times A^n \times G \rightarrow \mathbb{R}$ and the learning task is to find stochastic policies $\pi^n(a^n|o^n, g^n)$: $O^n \times G \times A^n \rightarrow [0,1]$, which condition only on local observations and goals, to maximize $\mathbb{E}_{s_t \sim \rho^\pi, a_{t-\pi}}[\Sigma_{t=0}^T \gamma^t \Sigma_{n=1}^N R(s_t, a_t^n, g^n)]$ over horizon T, where is y a discount factor. As used herein, $a^{-n}$ and $g^{-n}$ may denote the collection of all agents' actions and goals, respectively, except that of agent n; g may denote the collection of all agents' goals; and ($\pi$(a|o, g):=$\Pi_n \pi^n$(a$^n$|o$^n$, g$^n$) may denote the joint policy. $\mathbb{E}_\pi[.]$ may represent for $\mathbb{E}_{s \sim \rho^\pi, a \sim \pi[.]}$, where $\rho^\pi$ is defined as the discounted stationary state distribution under $\pi$.

In stage two, the simulator 108 may incorporate the learnings of other undertrained individuals or agents by observing the number of N agents using a centralized critic. In other words, the second critic may be the centralized critic. The simulator 108 may command the centralized critic to provide local and/or joint rewards. In this way, centralized learning centralized critic of decentralized policies may be provided. Because the second critic may be the centralized critic, the second stage or stage two may be associated with a global view or cooperation type learning for all of the N agents. The global view may be indicative of a flow of traffic for the N number of agents as a whole, while the local view may be indicative of movement, flow, or efficiency of merely the first agent. The global view and/or the local view may be taken from a birds-eye-view or perspective of the environment. Two views of the learning objective, corresponding to agents acting toward their own goal and corresponding to cooperation for the success of other agents may thus be provided by the two stages of simulation by the simulator 108. These two stages may be incorporated into a two-stage (e.g., or additional stages, such as three, four, etc.) curriculum bridged by neural network construction.

Explained yet again, in stage two, cooperation is learned by the number of N agents during simulation to achieve different features in a multi-agent setting or environment based on a double critic configuration. For example, the first agent may be trained in the first stage and the first, decentralized critic may facilitate learning of multiple features in the single-agent setting or environment. In the second stage, or stage two, the number of N agents may be instantiated into the Markov game, and equipped with the pre-trained $\pi 1$ (e.g., the previously trained parameters from the stage one first agent) and $V\pi$ (e.g., the previously trained parameters from the stage one first, decentralized critic) and the new centralized critic Q (e.g., the second critic).

During the second stage or stage two, the simulator 108 may train the N number of agents to achieve one or more cooperative tasks or to achieve different goals in the multi-agent setting or environment. This may be a dynamic environment. The multi-agent setting or environment provided by the simulator 108 in stage two may enable the N agents to learn to interact with one another, while enabling each one of the N agents to ultimately achieve their goals of reaching their target locations, respectively.

The simulator 108 may train the N number of agents by enabling each one of the N agents to select an action from a set of one or more actions including a no-operation action, an acceleration action, a deceleration action, a shift left one sub-lane action, and a shift right one sub-lane action, similarly to the first agent.

Examples of one or more of the features which may be learned in stage two by the N number of agents may include learning to avoid collisions with other agents, optimizing times to target locations. However, because the learning which occurred in stage one (e.g., learning how to drive in the static environment) is carried over, or instantiated into the simulation of stage two, learning may be achieved at a faster rate than if no division of stage one and stage two were provided by the simulator 108. According to one aspect, the one or more features learned in the single-agent environment of stage one may be different than the features learned in the multi-agent environment of stage two. In this way, the simulator 108 may instantiate the features learned from the first stage to the N agents of the second stage to facilitate curriculum learning.

As previously discussed, in stage two, the simulator 108 may incorporate the learnings of other undertrained individuals or agents by observing the number of N agents using the centralized critic. Because each of the N agents may be instantiated with the teachings (e.g., network policies) from the first stage or stage one, each one of the N agents may be pre-trained on how to drive around in the static environment.

Further, because there may be the number of N agents, each one of the N agents may be placed in different locations within the multi-agent environment, and be exposed to different scenarios. By having the simulator 108 and critic observe the number of N agents, learning for different scenarios may occur in parallel. Stated another way, the learning which may occur in stage two may be achieved by sharing data learned by a first agent with a second agent and vice versa (e.g., sharing data learned by the second agent with the first agent).

For example, if a first agent is trying to make a left lane change and is positioned in front of a second agent trying to make a right lane change, each one of the agents is being exposed to a different scenario, and network policies may be updated for both, thereby enhancing the efficiency of the learning, greatly reducing the amount of training time associated with training a CM3 system. In this example, the first agent and the second agent have different goals (e.g., a first goal of performing the left lane change and a second goal of performing the right lane change, perhaps to gain access to an exit ramp). It should be noted that cooperation learning may be implemented by the simulator 108. For example, if the first agent refused to allow the second agent to perform the right lane change and if the second agent refused to allow the first agent to perform the left lane change, a stalemate scenario may occur, benefitting neither agent.

The second agent neural network may be associated with an $o_{others}$ parameter for each of the N agents indicative of a local observation of each of the corresponding N agents. According to one aspect, the $o_{others}$ parameter may be indicative of a velocity of the first agent, a number of lanes or sub-lanes between the first agent and one of the N agents, a distance from the first agent to a goal position, or a vehicle type associated with the first agent. The $o_{others}$ parameter may be indicative of a vehicle occupancy status associated with one of the N agents, a relative velocity of one of the N agents relative to the first agent, or a vehicle type associated with one of the N agents.

Although, a third stage or stage three is not described herein, it is contemplated that in the third stage, each one of the N agents may be instantiated, by the simulator 108, with the pre-trained first agent neural network and the pre-trained second agent neural network and additional learning may occur, thereby enabling curriculum learning to be provided.

Policy Generation/Centralized Learning of Decentralized Policies

The processor 102 or the simulator 108 may generate a CM3 network policy based on the first agent neural network and the second agent neural network. The simulator 108 may bridge the two stages (e.g., stage one and stage two) by modular augmentation of neural network policy and value functions. The CM3 network policy may be indicative of data which may be utilized to direct the controller of the autonomous vehicle(s) of FIG. 1 to operation in an autonomous fashion. For example, the CM3 network policy may receive an input of an observation associated with the first autonomous vehicle or the second autonomous vehicle (e.g., a vehicle state or an environment state) and output a suggested action, which may include the no-operation action, the acceleration action, the deceleration action, the shift left one sub-lane action, and the shift right one sub-lane action, similarly to the actions used during simulation and provided by the simulator 108.

The CM3 network policy may be indicative of a combined view which is representative of the local view and the global view associated with the first stage and the second stage. According to one aspect, the simulator 108 may optimize the CM3 network policy based on the local view and the global view. In this way, a two-stage curriculum, including a single-agent stage for learning to accomplish individual tasks, followed by a multi-agent stage for learning to cooperate in the presence of other agents may be provided. The simulator 108 may bridge these two stages (e.g., the first stage and the second stage) by modular augmentation of neural network policy and value functions from the first stage and the second stage, respectively. In other words, the simulator 108 may modularly augment the neural network policy associated with the first stage or stage one with the neural network policy associated with the second stage or stage two. Similarly, the simulator 108 may modularly augment one or more value functions associated with the first stage or stage one with one or more value functions associated with the second stage or stage two.

As previously discussed, CM3 may implement an actor-critic or agent-critic framework to this curriculum by formulating local and global views of the policy gradient and learning, via a double critic, including a decentralized value function (e.g., associated with the first, decentralized critic) and a centralized action-value function (e.g., associated with the second, centralized critic). The simulator 108 may thus simulate both a single-agent setting and a multi-agent setting where each agent learns to accomplish goals or features within a finite set and cooperate with other agents with potentially different goals or features. In this regard, the CM3 framework of the method for cooperative multi-goal, multi-agent, multi-stage reinforcement learning or the system 100 for cooperative multi-goal, multi-agent, multi-stage reinforcement learning enables a multi-agent curriculum to provide one or more benefits or advantages.

For example, multi-agent exploration has previously been a difficult problem to tackle. By training a stage one network policy to achieve different goals in a single-agent setting, exploratory actions useful for finding cooperative solutions may be achieved after agents are setup to reliably generate conflict by acting toward individual goals learned in the single-agent setting.

As another example, a neural network construction for multi-agent reinforcement learning (MARL) may be provided. Specifically, stage one training for the agent or the actor and critic neural networks may be simplified by setting the associated input space to a part (e.g., this may be pre-defined, pre-programmed, set manually, etc. to a first set of goals or features) that is sufficient for achieving individual goals in the single-agent environment. In the stage two neural network construction, the architecture may be augmented, adjusted, or modified for further learning in the full multi-agent environment or based on the stage one training (e.g., stage one variables, parameters, neural networks, etc.). This enables decomposition of an agent's observation into a representation of the agent's own state (e.g., distance to a target location), and a representation of other agents.

Additionally, stage one and stage two are combined. In other words, a decentralized policy is trained using a double critic, including a decentralized value function for learning local objectives and a centralized action-value function for learning cooperation, thereby enabling local objectives or goals to be considered while also considering cooperation between agents by showing two equivalent views of the policy gradient and implementing the new actor-critic or agent-critic adaptation.

The CM3 framework (e.g., associated with the CM3 system and CM3 method) combines these features within a single curriculum including a simplified policy network with a decentralized critic to learn to achieve multiple goals in stage one, while stage two augments the policy's observation space to represent other agents and learns multi-agent cooperation using the double critic implementation. According to one aspect, parameter-sharing may be provided among one or more to all of the agents by the simulator 108.

A centralized critic receiving full state-action information may speed up learning of decentralized actors or agents (e.g., policies) that receive only local information, and only the actors may be retained for execution after training. According to one aspect, in a single-agent setting, policy $\pi$ (with parameter $\theta$ may maximize the objective $J(\pi):=\mathbb{E}_\pi \Sigma_t \gamma^t R(s_t)]$ by ascending the gradient:

$$\nabla_\theta J(\pi) = \mathbb{E}_\pi[\nabla_\theta \log \pi(a|s)(Q^\pi(s,a)-b(s))] \quad (1)$$

In equation (1), $Q^\pi(s, a):= \mathbb{E}_{s_{t-p}\pi_{,a_{t-a}}}[\Sigma_t \gamma^t R(s_t, a_t)|s_o=s, a_o=a)]$ is the action-value function, and $b(s)$ is any state-dependent baseline.

According to one aspect, a counterfactual baseline may be defined as:

$$b(s,a^{-n}):=\Sigma_{\hat{a}^n} \pi^n(\hat{a}^n|o^n) Q(s,(a^{-n}, \hat{a}^n)) \quad (2)$$

The counterfactual baseline may address the issue of multi-agent credit assignment: $Q(s, (a^{-n}, a^n))-b(s, a^{-n})$ may represent the contribution of an agent's chosen action and versus the average of all possible counterfactual actions $\hat{a}^n$, keeping other agents' actions fixed. The simulator 108 may employ parameter-sharing among all agents, meaning that all agents execute the same policy but may behave differently according to their individual observations.

The policy gradient may be defined as:

$$\nabla_\theta J(\pi) = \mathbb{E}_\pi[\Sigma_n \nabla_\theta \log \pi^n(a^n|o^n)(Q(s,a)-b(s,a^{-n})] \quad (3)$$

The CM3 framework described herein may be based on the counterfactual baseline (e.g., equation (3)) that accounts for individual objectives and mixtures of local and joint rewards.

FIG. 3 is an exemplary flow diagram of a method 300 for cooperative multi-goal, multi-agent, multi-stage reinforcement learning, according to one aspect. The method 300 may include training 302 a first agent and a first critic to learn features in a single-agent environment, training 304 a number of N agents to learn cooperation between agents in a multi-agent environment, instantiating N agents with a pretrained first agent neural network, and generating 306 a cooperative multi-goal, multi-agent, multi-stage (CM3) network policy based on the first agent neural network and the second agent neural network. Therefore, the acts of training 302 and training 304 including an incremental, multi-stage learning process to build the network policy of 306.

According to one aspect, the training 302 of the first agent in the single-agent environment may include training the first agent based on a first policy gradient and training a first critic based on a first loss function to learn one or more features in the single-agent environment using a Markov decision process. The first agent may be associated with a first agent neural network and the first critic may be associated with a first critic neural network. The first critic may be a decentralized critic.

According to one aspect, the training 304 of the N number of agents in the multi-agent environment may include training the number of N agents based on the first policy gradient and a second policy gradient and a second critic trained based on the first loss function and a second loss function to learn cooperation between the N agents in a multi-agent environment using a Markov game to instantiate a second agent neural network. Each of the N agents may be instantiated with the first agent neural network in a pre-trained fashion. The second critic may be a centralized critic. In this way, a double critic method may be provided. Further, training the first agent in the single-agent environment may occur prior to training the N agents in the multi-agent environment, thereby enhancing the efficiency of the CM3 reinforcement learning, as will be described herein.

Figure 4:
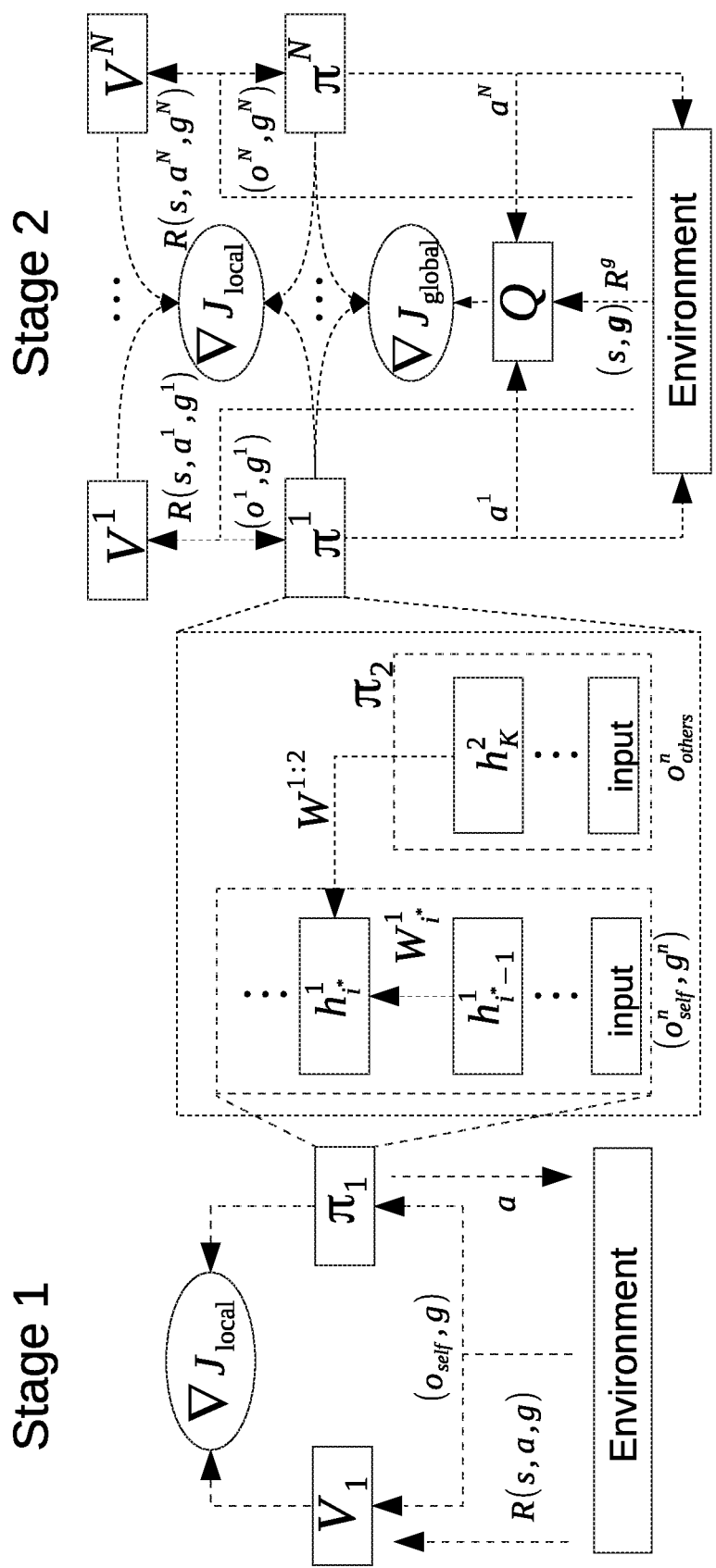
FIG. 4 is an exemplary data flow diagram in association with a method for cooperative multi-goal, multi-agent, multi-stage reinforcement learning, according to one aspect.

FIG. 4 is an exemplary data flow diagram in association with a method for cooperative multi-goal, multi-agent, multi-stage reinforcement learning, according to one aspect. In stage one of FIG. 4, a pair of reduced networks $V_1$ and $\pi_1$ may learn to achieve multiple goals in a single-agent environment, using policy gradient $\nabla J_{local}$. A new policy network 7 may be constructed from the trained $\pi_1$, a new module $\pi_2$, and construction for V. In the full multi-agent environment of stage two of FIG. 4, these larger $\pi$ and V may be instantiated for each of the N agents (with full parameter-sharing), along with a new centralized critic Q, and trained using the interpolated policy gradient.

A joint policy $\pi(a|o, g)$ with implied parameter $\theta$ shared by all individual $\pi^n(a^n|o^n, g^n)$ may be defined to maximize the objective:

$$J(\pi):= \mathbb{E}_\pi[\Sigma_t \gamma^t \Sigma_{n=1}^N R(s_t, a_t^n, g^n)] \quad (4)$$

The objective may be viewed in two ways (e.g., local and global), leading to the actor-critic pair of decentralized and centralized critics.

For the local view (e.g., first view), the simulator 108 may learn a decentralized critic from these rewards to provide a policy gradient for agents to achieve local goals without explicit regard to the joint success of all agents. Objectives $J_n(\pi):= \mathbb{E}_\pi[\Sigma_t \gamma^t R(s_t, a_n^t, g^n)]$ may be defined to correspond to individual goals $g^n$. $J_{local}$ may be maximized by ascending the gradient:

$$\nabla_\theta J_{local}(\pi) = \Sigma_{n=1}^N \nabla_\theta J_n(\pi) = \mathbb{E}_\pi[\Sigma_{n=1}^N \log \pi(a|o,g)$$
$$Q_n^\pi(s,a) \approx \mathbb{E}_\pi[\nabla_\theta \Sigma_{n=1}^N \log \pi(a|o,g)(R(s_t, a_t^n, g^n) - V^\pi(o_t, g^n))] \quad (5)$$

Each $Q_n^\pi(s, a):= \mathbb{E}_\pi[\Sigma_t \gamma^t R(s^t, a_t^n, g^n)|s_0=s, a_0=a)]$ is the state-action value corresponding to the individual reward $R(s, a^n, g^n)$.

In the second line of equation (5), the following approximations may be made:

1) for scalability, approximate all $Q_n^\pi(s, a)$ by a single $Q^\pi(s, a, g^n)$ with an additional input goal $g^n$, instead of using n different function approximators;

2) without changing the expectation, replace $Q^\pi(s, a, g^n)$ with the advantage function $A^\pi(s, a, g^n):=Q^\pi(s, a, g^n)-Q^\pi(s, a, g^n)$, and use the TD error $\delta_t^n:=R(s_t, a_t^n, g^n)+\gamma V^\pi(s_{t+1}, g^n)-V^\pi(s_t, g^n)$ as an unbiased estimate of the advantage value;

3) calculated the decentralized critic $V(o_t, g^n)$ by making a final approximation of $s_t$ with $o_t$.

Parameterized by $\theta_V$, the critic is updated by minimizing the loss:

$$\mathcal{L}(\theta_V) = \mathbb{E}_{s_t, a_t^n, s_{t+1}}[(R(s_t, a_t^n, g^n) + \gamma V(o_{t+1}, g^n; \theta'_V) - V(o_t, g^n; \theta_V))^2] \quad (6)$$

where $\theta'_V$ are parameters of a target network that slowly updates towards the main $\theta_V$.

For the global view (e.g., second view), a joint reward $R^g(s, a, g):= \Sigma_{n=1}^N R(s, a^n, g^n)$ may be defined. The joint reward may be used to learn a centralized critic that encourages each agent to contribute to other agents' success. $J_{global}$ may be defined as:

$$\nabla_\theta J_{global}(\pi) = \mathbb{E}_\pi[\Sigma_n \nabla_\theta \log \pi^n(a^n|o_n, g^n)(Q^\pi(s,a,g)-b(s, a^{-n}, g))] \quad (7)$$

$Q^\pi(s, a, g) = \mathbb{E}_\pi[\Sigma_{t'} \gamma^{t'} R^g(s_{t'}, a_{t'}, g)|s_0=s, a_0=a)]$ is the centralized critic and $b(s, a^{-n}, g)$ may be the generalized counterfactual baseline with multiple goals:

$$b(s,a^{-n},g) := \Sigma_{\hat{a}^n} \pi^n(\hat{a}^n|o^n, g^n) Q^\pi(s, (a^{-n}, \hat{a}^n), g) \quad (8)$$

Parameterized by $\theta_Q$, the centralized critic is updated by minimizing the loss:

$$\mathcal{L}(\theta_Q) = \mathbb{E}_{s_t, a_t, s_{t+1}}[R^g(s_t, a_t, g) + \lambda Q(s_{t+1}, a'_{t+1}, g; \theta'_Q)|a'_{t+1} \sim \pi - Q(s_t, a_t, g; \theta_Q))^2] \quad (9)$$

In equation (9), $\theta'_Q$ and $\pi'$ represent slowly-updating target Q and target policy networks, respectively.

For the combined view (e.g., third view), interpolation between both views using $\alpha \in (0,1)$ may be performed by the simulator 108 to determine the extent that the joint reward affects each agent's policy.

The overall policy gradient is defined as:

$$\nabla_\theta J(\pi) := \alpha \nabla_\theta J_{local}(\pi) + (1-\alpha) \nabla_\theta J_{global}(\pi) \quad (10)$$

The policy gradient may be viewed as a weighted-sum scalarization of a two-objective optimization problem, whose Pareto optima may be found by optimizing along equation (10) using convexity assumptions.

In stage one, an actor $\pi$ and decentralized critic $V^\pi$ may be trained to learn multiple goals in a single-agent setting. This stage may be based on the single-agent Markov decision process (MDP). The simulator 108 may train an actor $\pi(a^n|o^n, g^n)$ and critic $V^\pi(o^n, g^n)$ according to policy gradient $\nabla J_{local}$ equation (5) and loss $\mathcal{L}(\theta_V)$ equation (6), respectively. A goal may be uniformly sampled from G in each training episode, for the agent to learn all goals over the course of training. The simulator 108 may use deep neural networks for function approximation, and the input to the actor and critic networks may include the agent's observation vector $o^n$ and a vector $g^n$ representing the goal for a particular episode.

The simulator 108 may make the simple observation that multi-agent environments typically permit a decomposition of the agent's observation space into $O^n = O_{self}^n \cup O_{others}^n$, where $o_{self} \in O_{self}^n$ contains information about the agent's own state (e.g. position) while $p_{others} \in O_{others}^n$ is the agent's local observation of surrounding agents, and that the ability to process $o_{others}$ is unnecessary in stage one. In this way, the simulator 108 may reduce the size of the input space of $\pi$ and V to be set to $(O_{self}^n, g^n)$, thereby reducing the number of trainable parameters in stage one and enhancing training speed. The simulator 108 may train these reduced actor and critic networks until convergence, label them as $\pi 1$ and $V1$, respectively.

In stage two, the simulator 108 may instantiate all agents into the full Markov game, equipped with the pre-trained $\pi$ and $V^\pi$ and a new centralized critic Q, and conduct further training for cooperative behavior. The Markov game may be instantiated with N number of agents. The simulator 108 may retain the previously-trained $\pi 1$ parameters, instantiate a new neural network $\pi 2$ for agents to process the $o_{others}$ parameter of their local observation, and introduce hidden connections from the output of $\pi 2$ to a selected layer of $\pi 1$. Specifically, $h_i^1 \in \mathbb{R}^{m_i}$ may define the hidden activations of layer $i \leq L$ with $m_i$ units in an L-layer neural network representation of $\pi 1$, connected to layer $i-1$ via $h_i^1 = f(W_i^1 h_{i-1}^1)$ with $W_i^1 \in \mathbb{R}^{m_i \times m_{i-1}}$ and activation function f. stage two introduces a K-layer neural network $\pi 2$ ($o_{others}$) with output layer $k \in \mathbb{R}^{m_K}$ chooses a particular layer $i^*$ of $\pi_1$, and augments the hidden activations $h_{i^*}^1$ to be:

$$h_{i^*}^1 = f(W_{i^*}^1 h_{i^*-1}^1 + W^{1:2} h_K^2) (11), \text{ with } W^{1:2} \in \mathbb{R}^{m_{i^*} \times m_K}$$

An equivalent or similar augmentation may be made to critic V1 using a new neural network $V2(o_{others})$. The simulator 108 may instantiate the centralized critic $Q^\pi(s; a; g)$, which was not required and therefore absent during stage one, and train $\pi$; V; Q using the combined gradient $\nabla J$ equation (10), loss $\mathcal{L}(\theta_v)$ equation (6) and loss $L(\theta_Q)$ equation (9), respectively. Similarly to stage one, the simulator 108 may assign goals to agents by sampling (e.g., randomly) from a distribution over G during each training episode. The distribution can be constructed to ensure sufficient training on difficult goal combinations that require cooperation, along with easier combinations for maintaining agents' ability to act toward their goal.

This two-stage construction of actor-critic networks with curriculum learning improves learning speed compared to direct training on the full multi-agent environment. In this way, CM3 framework based systems and methods learn significantly faster and find more successful policies than even strong baselines. The two-stage curriculum and the decentralized critic facilitate this success, while the global view of policy gradient gives a noticeable advantage in finding a cooperative solution.

Further hidden layers $i < i^*$ that were pre-trained for processing ($o_{self}^n$, $g^n$) in stage one retain the ability to process task information, while the new module learns the effect of surrounding agents. Higher layers $i \geq i^*$ that can generate goal-directed actions in the single-agent setting of stage one are fine-tuned by the combined gradient to generate cooperative actions for joint success of all agents.

FIGS. 5A-5B are an exemplary flow diagram of a method for cooperative multi-goal, multi-agent, multi-stage reinforcement learning, according to one aspect. According to one aspect, the method of FIGS. 5A-5B illustrates pseudo-code for implementing a CM3 framework.

Figure 6:
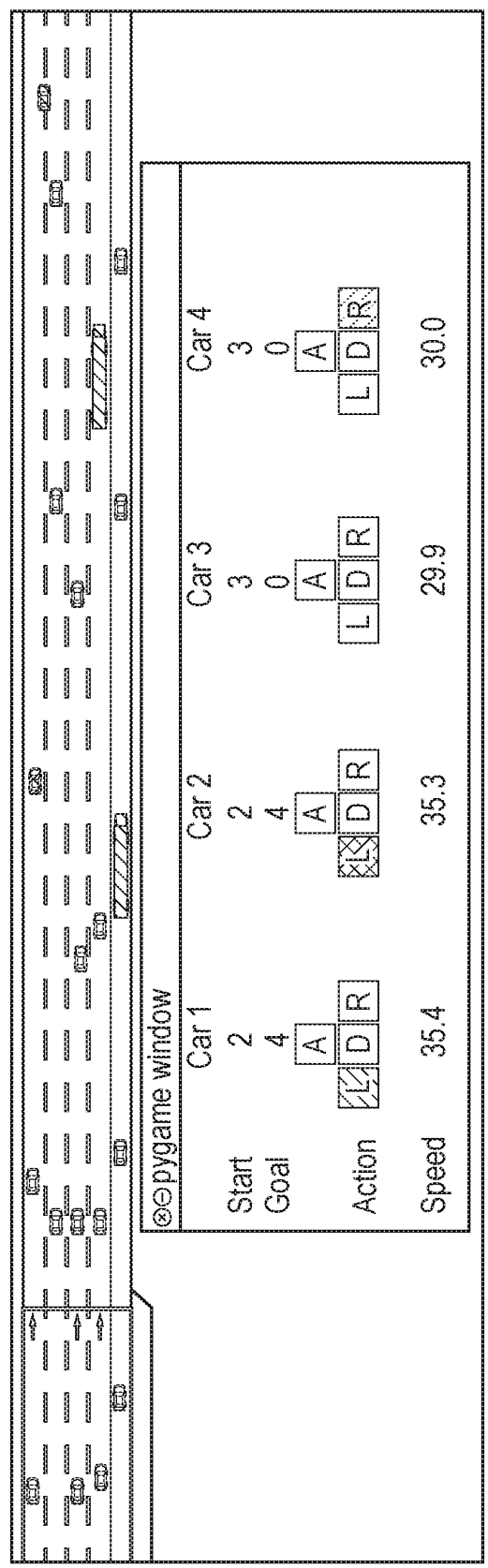
FIG. 6 is an exemplary simulation scenario in association with cooperative multi-goal, multi-agent, multi-stage reinforcement learning, according to one aspect.

FIG. 6 is an exemplary simulation scenario in association with cooperative multi-goal, multi-agent, multi-stage reinforcement learning, according to one aspect. In FIG. 6, one segment of a large road network in a traffic simulator 108 is illustrated. The simulator 108 may include 1 initial lanes starting at horizontal position $x_i$, two of which encounter a merge point, and 1-1 goal lanes at terminal position $x_f$. In each episode, N agents are emitted at $x_i$, on randomly selected initial lanes, and each agent n is associated with a randomly-selected goal lane $g^n$ that it should learn to reach at position $x_f$. Agents may receive observations with a limited field of view, choose actions from a discrete action space, and receive rewards according to both terminal and instantaneous criteria (e.g. reached goal, exceeded speed limit). The simulator 108 may define the following environments:

E1: a single agent on an otherwise empty road learns to reach any goal lane from any initial lane. This is used for stage one of CM3, which trains initial networks $\pi 1$ and V1 with objective $J_{local}$.

E2: N=4 agents are randomly initialized: with probability 0.8, initial and goal lanes are set so that a double-merge occurs; with probability 0.2, initial and goal lanes are uniformly sampled. The full stage two architecture of CM3 is trained in E2.

E2+: used to test generalization, with the traffic simulator-controlled vehicles emitted with probability 0.5/sec.

According to one aspect, the simulator 108 may train stage one in E1, followed by training of stage two on E2. According to another aspect, competitor methods may be trained directly in E2 (e.g., where vehicles or agents may compete rather than cooperate).

The simulator 108 may be setup to simulate a straight road of a total length, including one or more main lanes and one merge lane. Vehicles on the merge lane may be able to merge onto main lanes within a merge window, and the merge lane may end at a predetermined length. The lanes may have a width, and vehicles may be aligned along any of four sub-lanes within a lane, with a lateral spacing. The speed limit may be set to a predetermined speed. In E2+, the traffic simulator-controlled passenger cars and trucks (e.g., type trailer) that behave according to the Krauβ car-following model may be emitted on to main lanes with a predetermined probability per second. Simulation time resolution may be set to a simulation step time.

According to one aspect, in E1, the single agent's initial lane and goal lane may be sampled randomly from uniform distributions over the number of start and end lanes. In E2, with a probability 0:2, all agents' initial and goal lanes may be sampled independently from uniform distributions over the number of start and end lanes; with probability 0:8, agents [1,2,3,4] were initialized with initial lanes [2,2,3,3] and goal lanes [4,4,0,0]. Departure times may be drawn from normal distributions with mean [0; 2; 0; 2]s and standard deviation 0.2 s.

Local Observation

According to one aspect, each agent vehicle's local observation on may include two parameters. The first parameter relating to self, used in all training stages, may be a vector including agent's speed normalized, normalized number of sub-lanes between agent's current sub-lane and center sub-lane of goal lane, normalized longitudinal distance to goal position, binary indicator for being on the merge lane, normalized distance to the next segment along the road (using predefined segment boundaries).

According to another aspect, the second parameter may be a discretized observation grid centered on the agent, with four channels including: binary indicator of vehicle occupancy, normalized relative speed between other vehicle and agent, binary indicator of vehicle type being a passenger car, binary indicator of vehicle type being a truck.

Global State

The global state vectors may be the concatenation $o_{self}^1, \ldots, o_{self}^N$ of all agents' observation parameter $o_{self}^n$.

Goals

Each goal vector $g_n$ may be a one-hot vector of length, indicating the goal lane at which agent n should arrive once it reaches a predetermined position x. Goals may be randomly sampled for all agents during each episode.

Actions

All agents have the same discrete action space, including five options: no-operation action (e.g., maintain current speed and lane), accelerate, decelerate, and shift one sub-lane to the left, shift one sub-lane to the right. Each agent's action $a_n$ may be represented as a one-hot vector of a predetermined length.

Individual Rewards

According to one aspect, the reward $R(s_t, a_t^n, g^n)$; gn) for agent n with goal $g_n$ may be given according to the conditions:

−10 for a collision (followed by termination of episode)

−10 for time-out (exceed 120 simulation steps during episode)

+10(1−Δ) for reaching the end of the road and having a normalized sub-lane difference of from the center of the goal lane −5 for entering the merge lane from another lane during 200 m<x<400 m −0.5 for being in the merge lane during 200 m<x<400 m −0.1 if current speed exceeds 35.7 m/s Shared Global Reward According to one aspect, a shared global reward $Rg(s_t; a_t; g)$ may be determined by:

−10 if any collision occurred; and the average of all individual rewards of agents who reached the end of the road at time t.

Architecture

According to one aspect, the policy network $\pi_1$ during stage one feeds each of the inputs $o_{self}$ and $g^n$ to one fully-connected layer with 32 units. The concatenation may be fully-connected to a layer $h^{*\pi 1}$ with 64 units, and fully-connected to a softmax output layer with 5 units, each corresponding to one discrete action. In stage two, the input observation grid $o_{others}$ may be processed by a convolutional layer with 4 filters of size 5×3 and stride 1×1, flattened and fully-connected to a layer with 64 units, then fully-connected to the layer $h^{*\pi_1}$ of $\pi_1$. ReLU nonlinearity may be used for all hidden layers. Action probabilities are computed by lower-bounding the softmax outputs via $Pr(a^n=i)=(1-\epsilon)$ softmax(i)+ϵ/|A|, where ϵ is a decaying exploration parameter and |A|=5.

The decentralized critic V1, during stage one, may feed each of the inputs $o_{self}$ and $g^n$ to one fully-connected layer with 32 units. The concatenation may be fully-connected to the output linear layer hV1_ with a single unit. In stage two, the input observation grid $o_{others}$ may be processed by a convolutional layer 13 with 4 filters of size 5×3 and stride 1×1, flattened and fully-connected to a layer with 32 units, then fully-connected to the output layer $h^{*V_1}$ of V1. ReLU nonlinearity may be used for all hidden layers.

The centralized critic Q(s, a, g) may receive input (s, $a^{-n}$, $g^n$, $g^{-n}$, n), which may be connected to two fully connected layers with 128 units and ReLU activation, and fully-connected to a linear output layer with 5 units. The value of each output node i may be interpreted as the action-value Q(s, $a^{-n}$, $a^n$≤i, g) for agent n taking action i and all other agents taking action $a^{-n}$. The agent label vector n is a one-hot indicator vector, used as input to differentiate between evaluations of the Q-function for different agents.

Double replay buffers $B_1$ and $B_2$ may be used as a heuristic to improve training stability for all algorithms on stage two. Instead of storing each environment transition immediately, an additional episode buffer may be used to store all transitions encountered during each episode. At the end of each episode, the cumulative reward of all agents may be compared against a threshold (e.g., 32), to determine whether the transitions in the episode buffer should be stored into $B_1$ or $B_2$. For training, half of the minibatch is sampled from each of $B_1$ and $B_2$.

Figure 7:
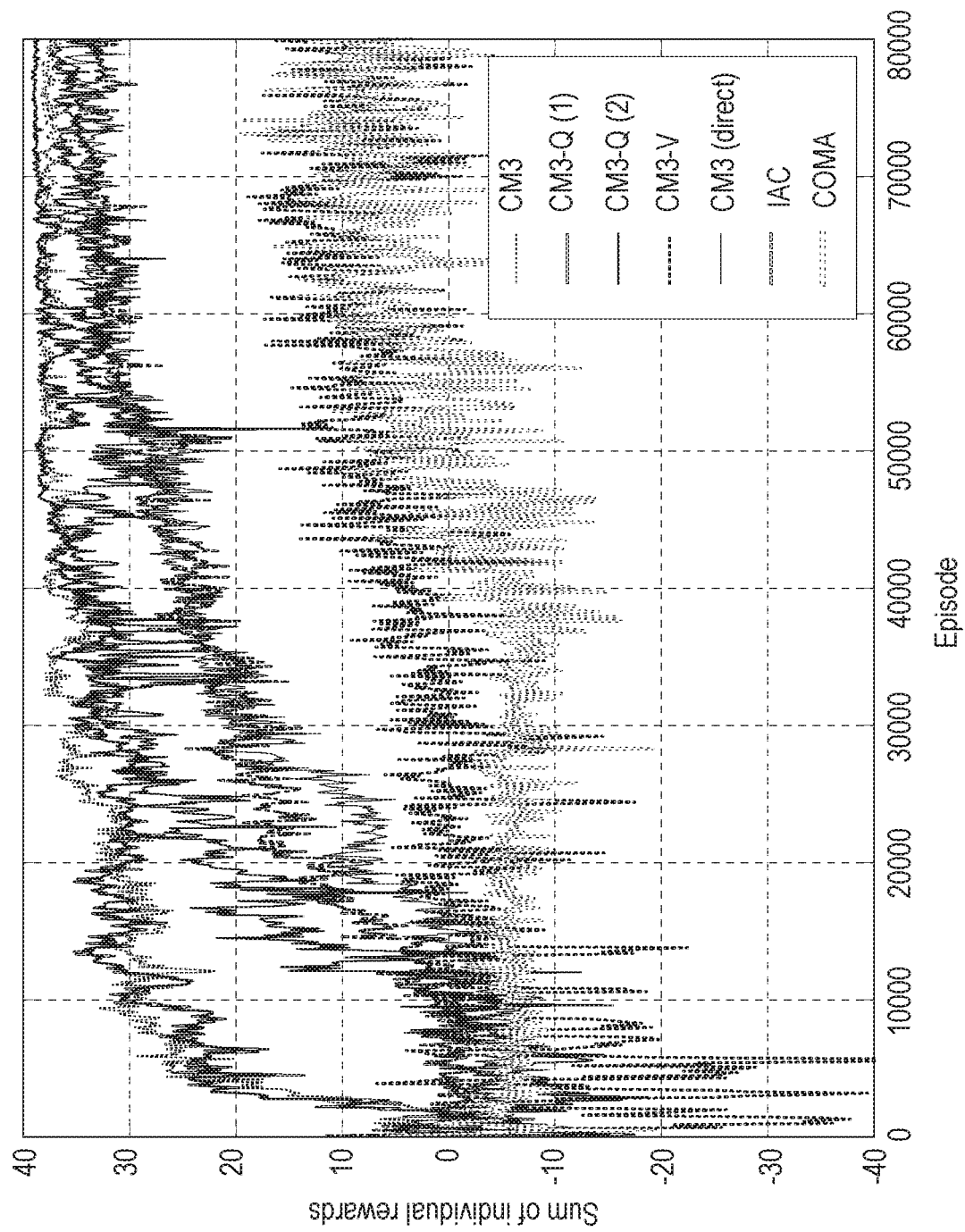
FIGS. 7-8 are exemplary performance results in association with cooperative multi-goal, multi-agent, multi-stage reinforcement learning, according to one aspect.
Figure 8:
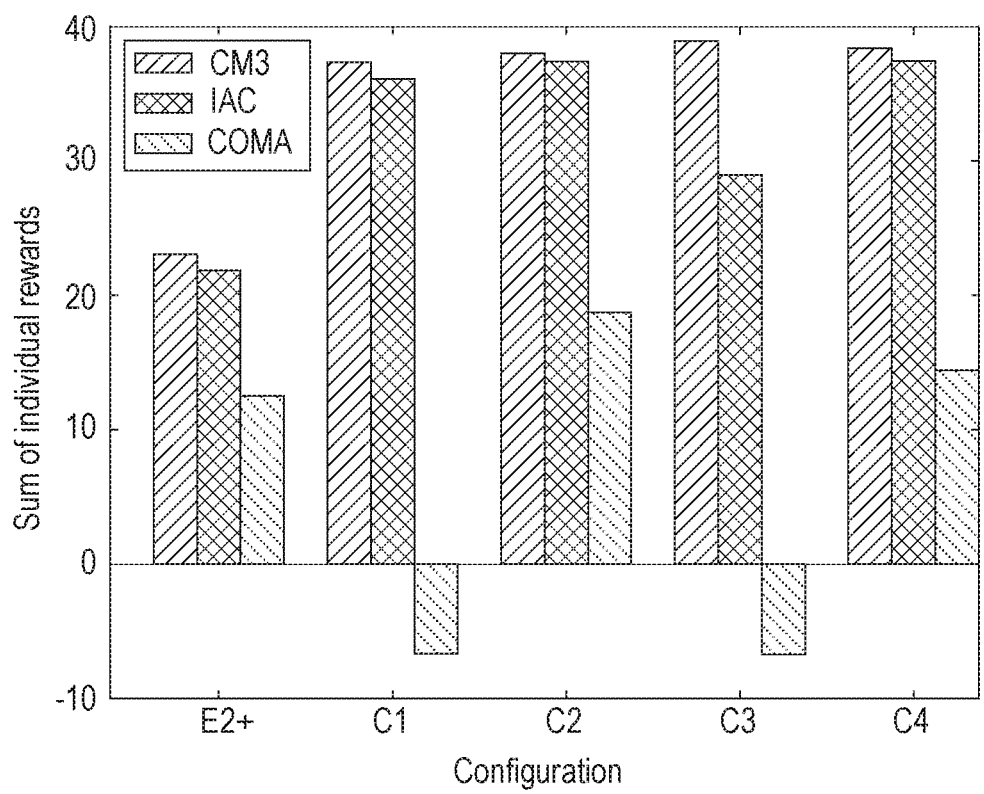

FIGS. 7-8 are exemplary performance results in association with cooperative multi-goal, multi-agent, multi-stage reinforcement learning, according to one aspect. As seen in FIG. 7, CM3 converged to higher performance more than 45 k episodes earlier than other techniques in E2. In FIG. 8, it may be seen that a policy learned by a CM3 framework based system or method generalizes better to E2+.

Figure 9:
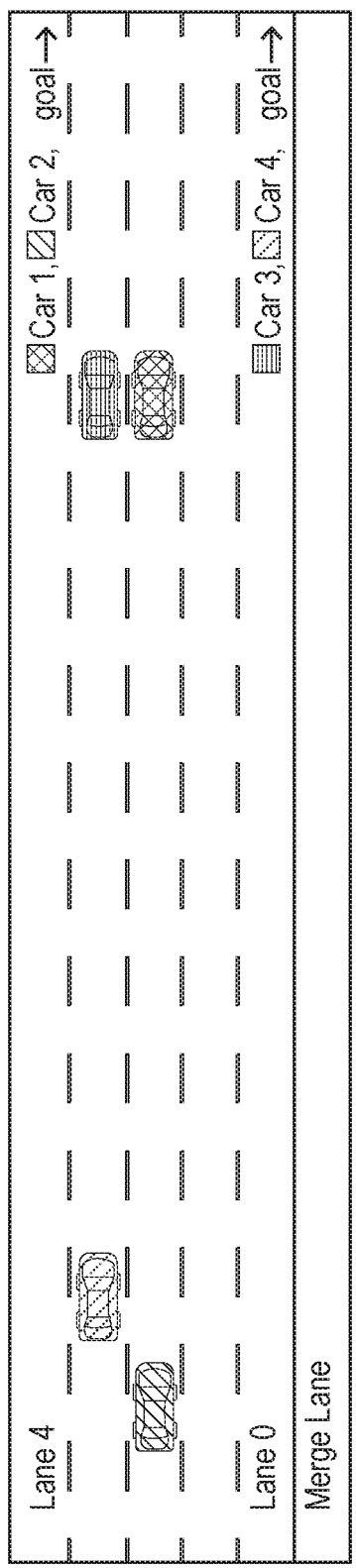
FIG. 9 is an exemplary simulation scenario in association with cooperative multi-goal, multi-agent, multi-stage reinforcement learning, according to one aspect.

FIG. 9 is an exemplary simulation scenario in association with cooperative multi-goal, multi-agent, multi-stage reinforcement learning, according to one aspect. In FIG. 9, an initial lane configuration associated with E2 requires agents to perform a double-merge or a double-lane change to reach their goal lanes.

Figure 10:
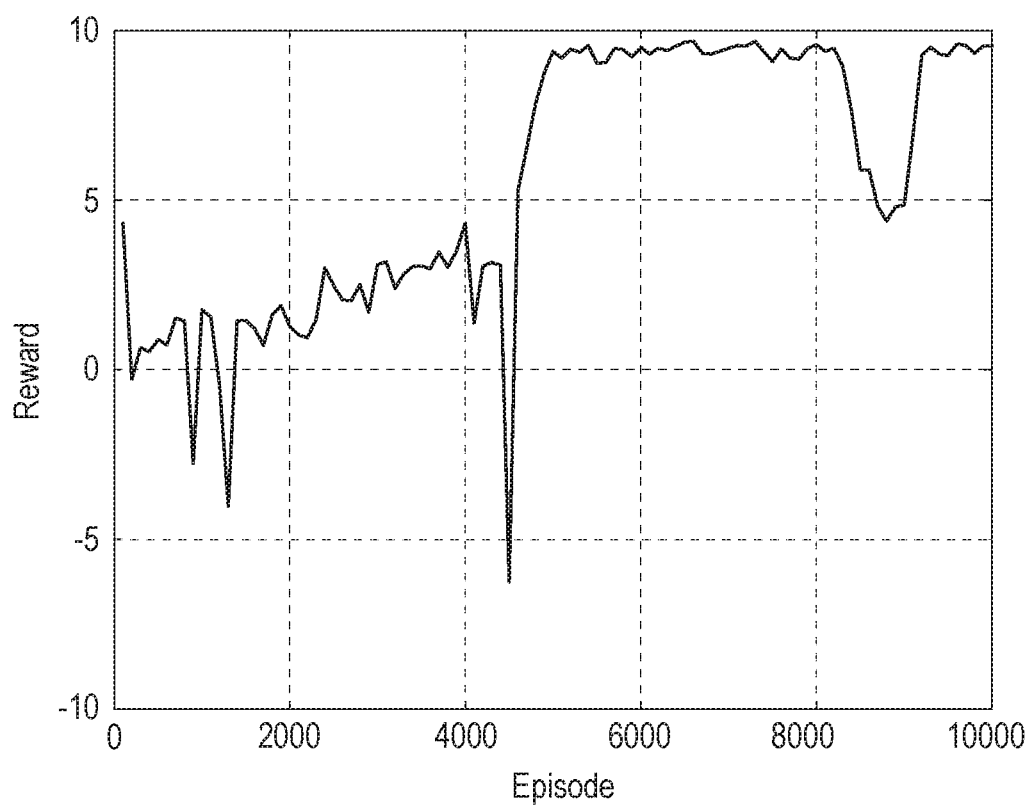
FIG. 10 is an exemplary reward versus episode graph in association with cooperative multi-goal, multi-agent, multi-stage reinforcement learning, according to one aspect.

FIG. 10 is an exemplary reward versus episode graph in the single-agent environment E1, according to one aspect.

Figure 11:
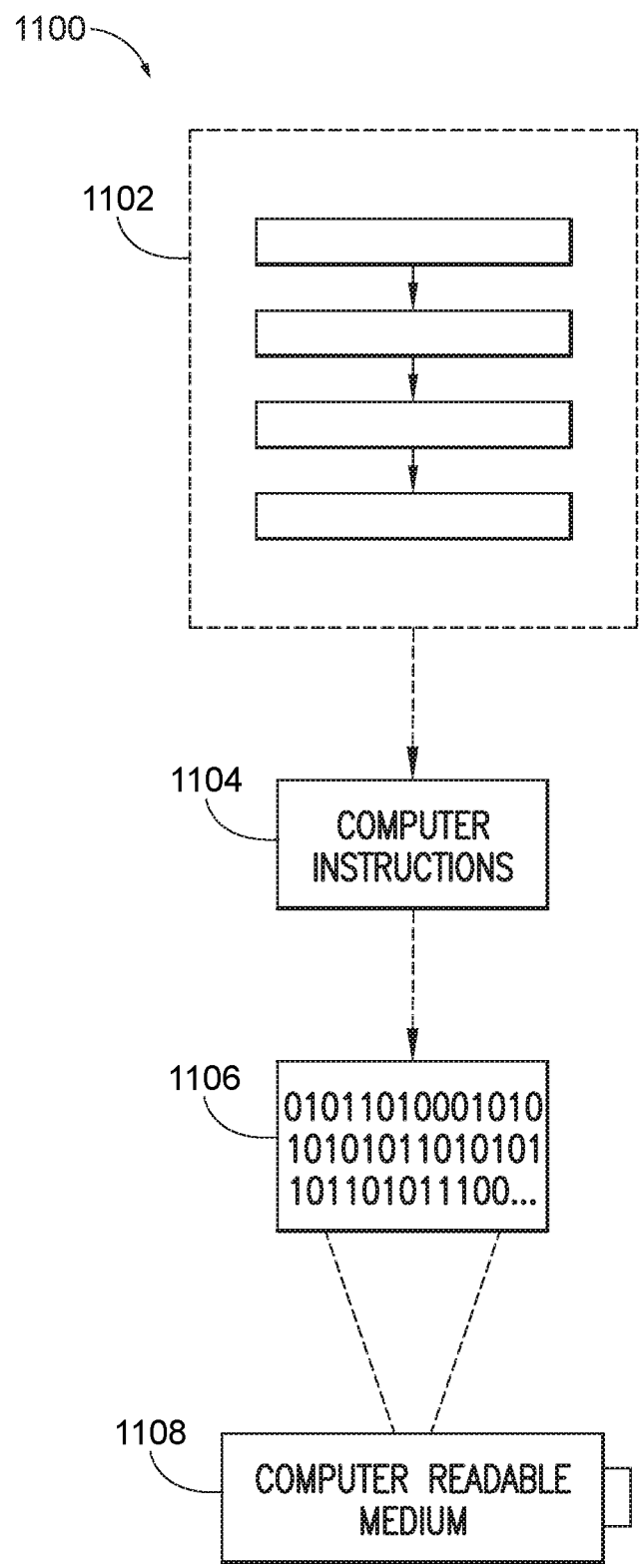
FIG. 11 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 11, wherein an implementation 1100 includes a computer-readable medium 1108, such as a CD-R, DVD-R, flash drive, a platter of a hard disk drive, etc., on which is encoded computer-readable data 1106. This encoded computer-readable data 1106, such as binary data including a plurality of zero's and one's as shown in 1106, in turn includes a set of processor-executable computer instructions 1104 configured to operate according to one or more of the principles set forth herein. In this implementation 1100, the processor-executable computer instructions 1104 may be configured to perform a method 1102, such as the method 300 of FIG. 3 or the method of FIGS. 5A-5B. In another aspect, the processor-executable computer instructions 1104 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 12:
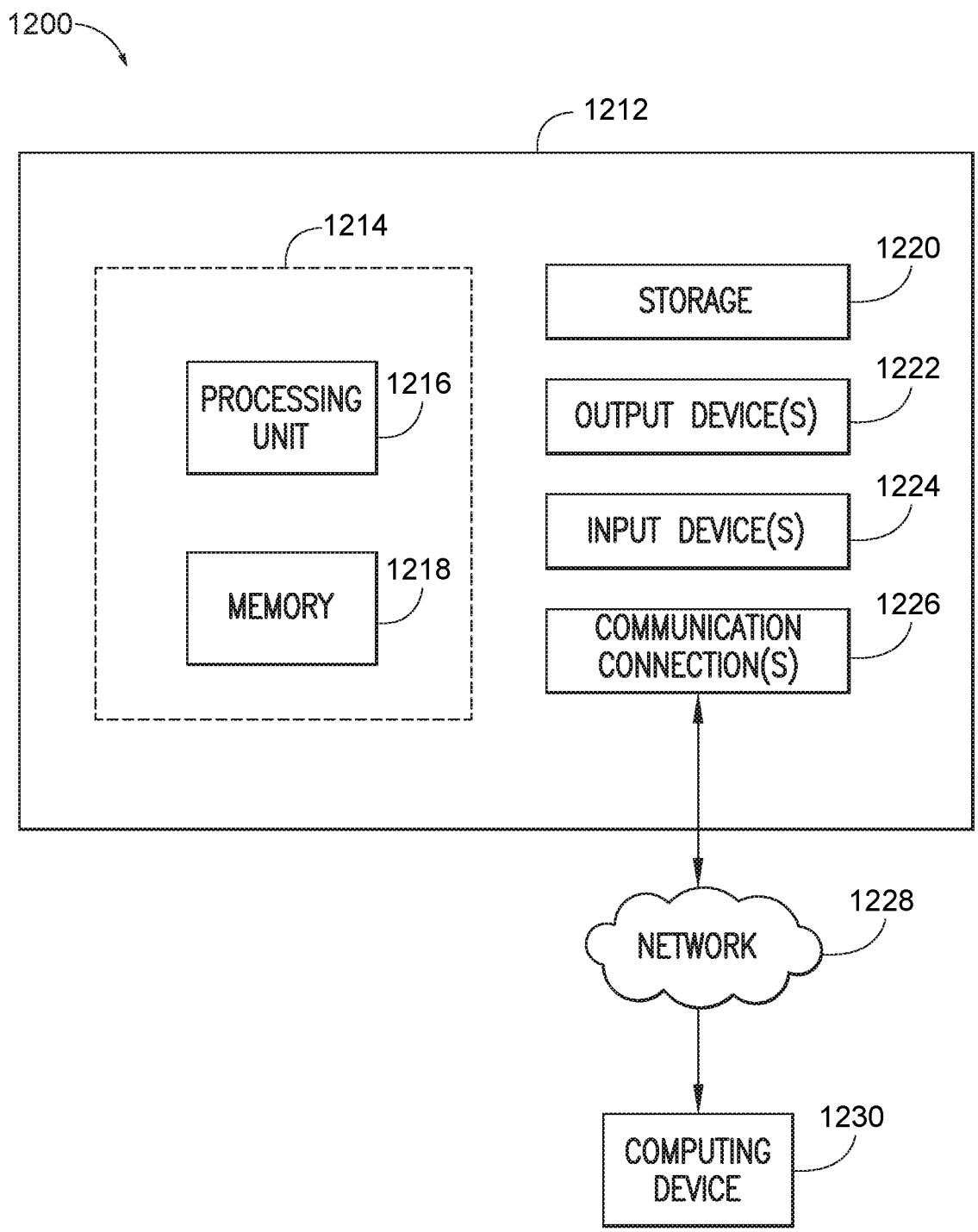
FIG. 12 is an illustration of an example computing environment where one or more of the provisions set forth herein are implemented, according to one aspect.

FIG. 12 and the following discussion provide a description of a suitable computing environment to implement aspects of one or more of the provisions set forth herein. The operating environment of FIG. 12 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 12 illustrates a system 1200 including a computing device 1212 configured to implement one aspect provided herein. In one configuration, the computing device 1212 includes at least one processing unit 1216 and memory 1218. Depending on the exact configuration and type of computing device, memory 1218 may be volatile, such as RAM, non-volatile, such as ROM, flash memory, etc., or a combination of the two. This configuration is illustrated in FIG. 12 by dashed line 1214.

In other aspects, the computing device 1212 includes additional features or functionality. For example, the computing device 1212 may include additional storage such as removable storage or non-removable storage, including, but not limited to, magnetic storage, optical storage, etc. Such additional storage is illustrated in FIG. 12 by storage 1220. In one aspect, computer readable instructions to implement one aspect provided herein are in storage 1220. Storage 1220 may store other computer readable instructions to implement an operating system, an application program, etc. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1212. Any such computer storage media is part of the computing device 1212.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1212 includes input device(s) 1224 such as keyboard, mouse, pen, voice input device, touch input device, infrared cameras, video input devices, or any other input device. Output device(s) 1222 such as one or more displays, speakers, printers, or any other output device may be included with the computing device 1212. Input device(s) 1224 and output device(s) 1222 may be connected to the computing device 1212 via a wired connection, wireless connection, or any combination thereof. In one aspect, an input device or an output device from another computing device may be used as input device(s) 1224 or output device(s) 1222 for the computing device 1212. The computing device 1212 may include communication connection(s) 1226 to facilitate communications with one or more other devices 1230, such as through network 1228, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for cooperative multi-goal, multi-agent, multi-stage (CM3) reinforcement learning, comprising:
training a first agent based on a first policy gradient and training a first critic based on a first loss function to learn one or more goals in a single-agent environment using a Markov decision process, wherein the first agent is associated with a first agent neural network and the first critic is associated with a first critic neural network;
training a number of N agents based on the first policy gradient and training a second policy gradient and a second critic based on the first loss function and a second loss function to learn cooperation between the N agents in a multi-agent environment using a Markov game to instantiate a second agent neural network, wherein each of the N agents is instantiated with the first agent neural network in a pre-trained fashion, wherein the number of N agents are of the same type as the first agent;
generating a cooperative multi-goal, multi-agent, multi-stage network policy based on the first agent neural network and the second agent neural network; and
operating an autonomous vehicle in an autonomous fashion based on the cooperative multi-goal, multi-agent, multi-stage network policy.

2. The method for cooperative multi-goal, multi-agent, multi-stage reinforcement learning of claim 1, wherein the first critic is a decentralized critic.

3. The method for cooperative multi-goal, multi-agent, multi-stage reinforcement learning of claim 1, wherein the second critic is a centralized critic.

4. The method for cooperative multi-goal, multi-agent, multi-stage reinforcement learning of claim 1, wherein training the first agent in the single-agent environment occurs prior to training the N agents in the multi-agent environment.

5. The method for cooperative multi-goal, multi-agent, multi-stage reinforcement learning of claim 1, comprising training the number of N agents based on a combined policy gradient derived from the first policy gradient and the second policy gradient.

6. The method for cooperative multi-goal, multi-agent, multi-stage reinforcement learning of claim 1, wherein the second agent neural network is associated with an $o_{others}$ parameter for each of the N agents indicative of a local observation of each of the corresponding N agents.

7. The method for cooperative multi-goal, multi-agent, multi-stage reinforcement learning of claim 6, wherein the $o_{others}$ parameter is indicative of a velocity of the first agent, a number of lanes or sub-lanes between the first agent and one of the N agents, a distance from the first agent to a goal position, or a vehicle type associated with the first agent.

8. The method for cooperative multi-goal, multi-agent, multi-stage reinforcement learning of claim 6, wherein the $o_{others}$ parameter is indicative of a vehicle occupancy status associated with one of the N agents, a relative velocity of one of the N agents relative to the first agent, or a vehicle type associated with one of the N agents.

9. The method for cooperative multi-goal, multi-agent, multi-stage reinforcement learning of claim 1, wherein the number of N agents includes the first agent.

10. The method for cooperative multi-goal, multi-agent, multi-stage reinforcement learning of claim 1, wherein training the first agent and training the number of N agents includes generating one or more actions including a no-operation action, an acceleration action, a deceleration action, a shift left one sub-lane action, and a shift right one sub-lane action.

11. A system for cooperative multi-goal, multi-agent, multi-stage (CM3) reinforcement learning, comprising:
a processor;
a memory; and
a simulator implemented via the processor and memory, performing:
training a first agent based on a first policy gradient and training a first critic based on a first loss function to learn one or more goals in a single-agent environment using a Markov decision process, wherein the first agent is associated with a first agent neural network and the first critic is associated with a first critic neural network;
training a number of N agents based on the first policy gradient and a second policy gradient and training a second critic based on the first loss function and a second loss function to learn cooperation between the N agents in a multi-agent environment using a Markov game to instantiate a second agent neural network, wherein each of the N agents is instantiated with the first agent neural network in a pre-trained fashion, wherein the number of N agents are of the same type as the first agent; and generating a cooperative multi-goal, multi-agent, multi-stage network policy based on the first agent neural network and the second agent neural network, wherein an autonomous vehicle is operated in an autonomous fashion based on the cooperative multi-goal, multi-agent, multi-stage network policy.

12. The system for cooperative multi-goal, multi-agent, multi-stage reinforcement learning of claim 11, wherein the first critic is a decentralized critic and the second critic is a centralized critic.

13. The system for cooperative multi-goal, multi-agent, multi-stage reinforcement learning of claim 11, wherein the simulator trains the first agent in the single-agent environment prior to training the N agents in the multi-agent environment.

14. The system for cooperative multi-goal, multi-agent, multi-stage reinforcement learning of claim 11, wherein the second agent neural network is associated with an $o_{others}$ parameter for each of the N agents indicative of a local observation of each of the corresponding N agents.

15. A cooperative multi-goal, multi-agent, multi-stage (CM3) reinforcement learning based autonomous vehicle, comprising:
a storage device storing a cooperative multi-goal, multi-agent, multi-stage network policy; and
a controller operating the autonomous vehicle in an autonomous fashion based on the cooperative multi-goal, multi-agent, multi-stage network policy,
wherein the cooperative multi-goal, multi-agent, multi-stage network policy is generated based on a first agent neural network and a second agent neural network,
wherein a first agent is trained based on a first policy gradient and a first critic trained based on a first loss function to learn one or more goals in a single-agent environment using a Markov decision process, wherein the first agent is associated with the first agent neural network and the first critic is associated with a first critic neural network; and
wherein a number of N agents are trained based on the first policy gradient and a second policy gradient and a second critic trained based on the first loss function and a second loss function to learn cooperation between the N agents in a multi-agent environment using a Markov game to instantiate the second agent neural network, wherein each of the N agents is instantiated with the first agent neural network in a pre-trained fashion,
wherein the number of N agents are of the same type as the first agent.

16. The cooperative multi-goal, multi-agent, multi-stage reinforcement learning based autonomous vehicle of claim 15, wherein the second agent neural network is associated with an $o_{others}$ parameter for each of the N agents indicative of a local observation of each of the corresponding N agents.

17. The cooperative multi-goal, multi-agent, multi-stage reinforcement learning based autonomous vehicle of claim 16, wherein the $o_{others}$ parameter is indicative of a velocity of the first agent, a number of lanes or sub-lanes between the first agent and one of the N agents, a distance from the first agent to a goal position, or a vehicle type associated with the first agent.

18. The cooperative multi-goal, multi-agent, multi-stage reinforcement learning based autonomous vehicle of claim 16, wherein the $o_{others}$ parameter is indicative of a vehicle occupancy status associated with one of the N agents, a relative velocity of one of the N agents relative to the first agent, or a vehicle type associated with one of the N agents.

19. The cooperative multi-goal, multi-agent, multi-stage reinforcement learning based autonomous vehicle of claim 15, wherein the number of N agents includes the first agent.

20. The cooperative multi-goal, multi-agent, multi-stage reinforcement learning based autonomous vehicle of claim 15, wherein training the first agent and training the number of N agents includes generating one or more actions including a no-operation action, an acceleration action, a deceleration action, a shift left one sub-lane action, and a shift right one sub-lane action.

* * * * *